United States Patent [19]
Studor et al.

[11] Patent Number: 5,848,289
[45] Date of Patent: Dec. 8, 1998

[54] EXTENSIBLE CENTRAL PROCESSING UNIT

[75] Inventors: Charles F. Studor; James S. Divine, both of Austin, Tex.

[73] Assignee: Motorola, Inc., Schaumburg, Ill.

[21] Appl. No.: 982,327

[22] Filed: Nov. 27, 1992

[51] Int. Cl.[6] .................................................. G06F 9/30
[52] U.S. Cl. ..................... 395/800.32; 395/570; 395/384
[58] Field of Search .................................... 395/800, 375, 395/500, 384, 385, 386, 388, 570, 800.01, 800.32; 364/DIG. 1

[56] References Cited

U.S. PATENT DOCUMENTS

| | | | |
|---|---|---|---|
| 4,236,204 | 11/1980 | Groves | 364/DIG. 1 |
| 4,293,907 | 10/1981 | Huang et al. | 364/DIG. 1 |
| 4,374,418 | 2/1983 | Catiller et al. | 364/DIG. 1 |
| 5,150,468 | 9/1992 | Staplin et al. | 395/375 |
| 5,249,273 | 9/1993 | Yoshitake et al. | 395/375 |
| 5,335,331 | 8/1994 | Murao et al. | 395/375 |
| 5,420,992 | 5/1995 | Killian et al. | 395/375 |
| 5,430,862 | 7/1995 | Smith et al. | 395/500 |
| 5,479,652 | 12/1995 | Dreyer et al. | 395/183.06 |

FOREIGN PATENT DOCUMENTS

WO89/11128  11/1989  European Pat. Off. .......... G06F 9/26

OTHER PUBLICATIONS

Owen Linderholm, "The Single–Chip OC: Chips & Technologies' new F8680 brings functional integration in microprocessors to new heights," Byte Magazine, Nov. 1991, pp. 148–162.

Michael C. Markowitz, "x86–compatible CPUs' supervisory layer lets you customize PC designs," EDN Editors' Choce Innovation, Oct. 10, 1991, pp. 126–127.

Motorola, Inc., MC88110 Second Generation RISC Microprocessor User's Manual, 1991, pp. 1–4 through 1–7, 2–10, Oct. 1995.

Bill Ledbetter, et al., "The 68040 Integer and Floating–Point Units," IEEE compcon 1990 Proceedings, pp. 259–263.

(List continued on next page.)

*Primary Examiner*—Larry D. Donaghue
*Assistant Examiner*—Walter D. Davis, Jr.
*Attorney, Agent, or Firm*—Susan C. Hill; Jeffrey Van Myers; Sandra L. Godsey

[57] ABSTRACT

An extensible central processing unit (CPU) (12 or 12'). By modifying the architecture of a new or prior art CPU, a new or prior art CPU can be made extensible so that new instructions can be added in a simple and cost effective manner to meet differing customer needs. The term "extensible" in regard to a CPU is used to mean that new instructions can be added to the CPU simply by adding certain designated circuitry, without the need to significantly change the existing CPU circuitry. In some embodiments, the additional designated circuitry may include control circuitry in the form of CPU control extension circuitry (52 or 152). In some embodiments, the additional circuitry may include non-control circuitry in the form of execution unit extension circuitry (153).

55 Claims, 8 Drawing Sheets

OTHER PUBLICATIONS

Robin W. Edenfield, et al., "The 68040 Processor Part 1, Design and Implementation," IEEE Micro, Feb. 1990, pp. 68–78.

Motorola, HC05 MC68HC054P4 Technical Data, MC68HC054P4 HCMOS Microcontroller Unit, 1990, Section 3: Central Processor Unit, pp. 3–1 through 3–26.

Moser, Jr., C. W. "Increasing an instruction set without increasing word length," Electronics, Feb. 6, 1975, pp. 114–115.

Desautels, J.C., G J. Rudy and J. L. Temple, III, "New Instruction and Extended Instruction Handling," IBM Technical Disclosure Bulletin, vol. 21, No. 1, Jun. 1978, pp. 201–202.

"Full Function Series/1 Instruction Set Emulator," IBM Technical Disclosure Bulletin, vol. 29, No. 2, Jul. 1986, pp. 548–549.

Gattag, Karl and Jerry Van Aken, "Macrostore Firmware Emulation as an Alternative to Co–Processors," 8080 Wescon Technical Paper, vol. 26, Sep. 1982, pp. 1–5.

Motorola, Inc., MC8810 Second Generation RISC Microprocessor User's Manual, 1991, pp. 1–4 through 1–7, 2–10, 10–95.

Hotta et al., "A 70–MHz 32–b Microprocessor with 1.0–$\mu$m, BiCMOS Marrocell Library", *IEEE Journal of Solid–State Circuits*, vol. 25, No. 3, Jun. 1990, pp. 770–777.

Linderholm, "The Single–Chip PC: Chips & Technologies' new F8680 brings functional integration in microprocessors to new heights," Byte Magazine, Nov. 1991, pp. 148–162.

Markowitz, "x86–compatible CPUs' supervisory byer lets you customize PC designs," EDN Editors' choice Innovation, Oct. 10, 1991, pp. 126–127.

FIG. 4  FIRST STATE SEQUENCER 58

FIG.5   FIRST STATE SEQUENCER 158

FIG.6  SECOND STATE SEQUENCER 68

EXTENSIBLE CENTRAL PROCESSING UNIT

FIELD OF THE INVENTION

The present invention relates in general to a central processing unit, and more particularly to an extensible central processing unit.

BACKGROUND OF THE INVENTION

A central processing unit (CPU) is generally the primary "brain" of a microcomputer integrated circuit (MCU). Aside from the CPU, an MCU normally includes one or more on-board peripherals or sections, such as memories, timers, and bus interfaces. The CPU however, is usually responsible for receiving and interpreting the software instructions used to control the MCU.

One particular CPU may be used on a variety of MCUs. If the same CPU is used on a variety of MCUs, these MCUs are generally considered to form a "family" (such as the MC68HC05 family of microcomputers, available from Motorola, Inc. of Austin, Tex.). There are many advantages to using the same CPU on a variety of MCUs, both from the manufacturer's point of view and from the customer's point of view. One such advantage is software compatibility among MCUs in a family which use the same CPU.

However, a problem arises because a family of MCUs is normally used in a wide range of applications. Some MCU customers either desire or require custom instructions (also called application specific instructions), e.g. digital signal processing instructions or fuzzy logic instructions. However, other MCU customers do not need these custom instructions and are unwilling to pay the extra cost associated with having these custom instructions as part of the CPU. Thus no matter how the trade-off between application specific instructions and cost is made, there will be many MCU customers who will be dissatisfied with the tradeoffs made by the CPU designer.

A second problem arises due to the fact that a family of MCUs is generally on the market for several years. However, the requirements of MCU customers change at a faster pace. For example, as little as five years ago, few, if any, MCU customers required fuzzy logic instructions. Today, it is not uncommon for fuzzy logic instructions to be a requirement for a significant number of MCU customers. As a result, it is very difficult to design a CPU today which will incorporate the application specific instructions which will be most commonly required during the lifetime of the CPU. In fact, some of the application specific instructions which will be required in the future by a significant number of MCU customers may not yet be known.

A third problem arises because some MCU customers have a few critical software routines which cannot be satisfactorily performed by an existing low cost CPU. These MCU customers are therefore forced to use an MCU with a more powerful and more expensive CPU in order to meet the needs of a few critical software routines. However, the more powerful and more expensive CPU may not meet the customer's power consumption and/or cost limitations.

The above-mentioned problems are most acute in MCU applications which are very cost sensitive, for example, low-end MCUs such as the MC68HC05 family of microcomputers. In the present MC68HC05 family of microcomputers, there is no simple and cost effective way to add new instructions. Thus there is no simple and cost effective way to customize a CPU as the needs and requirements of MCU customers change.

SUMMARY OF THE INVENTION

The previously mentioned needs are fulfilled and other advantages achieved with the present invention. In one form, the present invention is an extensible central processing unit.

In one embodiment, the present invention is a central processing unit having an execution unit. The execution unit includes a first set of control inputs for receiving a first set of control signals. The first set of control signals is capable of controlling all of the execution unit. The execution unit also includes a second set of control inputs which are capable of receiving a second set of control signals. The second set of control signals is capable of controlling all of the execution unit. The execution unit also includes all status registers within the central processing unit. The central processing unit also has a first control unit which is coupled to the execution unit. The first control unit provides the first set of control signals.

The present invention will be understood by one skilled in the art from the detailed description below in conjunction with the accompanying drawings.

BRIEF DESCRIPTION OF THE DRAWINGS

FIG. 1 illustrates, in block diagram form, a data processing system 10 in accordance with one embodiment of the present invention;

FIG. 2 illustrates, in block diagram form, an extensible central processing unit 12 of FIG. 1 in accordance with one embodiment of the present invention;

FIG. 3 illustrates, in block diagram form, an alternate extensible central processing unit 12' of FIG. 1 in accordance with one embodiment of the present invention;

FIG. 4 illustrates, in block diagram form, a first state sequencer 58 of FIG. 2 in accordance with one embodiment of the present invention;

FIG. 5 illustrates, in block diagram form, a first state sequencer 158 of FIG. 3 in accordance with one embodiment of the present invention;

FIG. 6 illustrates, in block diagram form, a second state sequencer 68 of FIG. 2 in accordance with one embodiment of the present invention;

FIG. 7 illustrates, in block diagram form, a second state sequencer 168 of FIG. 3 in accordance with one embodiment of the present invention; and FIG. 8 illustrates, in block diagram form, a portion of an execution unit 56 of FIG. 2 and an identical portion of an execution unit 156 of FIG. 3 in accordance with one embodiment of the present invention.

DESCRIPTION OF THE PREFERRED EMBODIMENT

A simple and cost effective way to add new instructions to a central processing unit (CPU) was needed. By modifying the architecture of a new or prior art CPU, the new or prior art CPU can be made extensible so that new instructions cane be added in a relatively simple and cost effective manner. The term "extensible" in regard to a CPU is used to mean that new instructions can be added to the CPU simply by adding certain designated circuitry, without the need to significantly change the existing CPU circuitry.

Using the present invention, an extensible CPU can be designed with a basic set of instructions that meet the requirements of the lower cost customers. Because of the simplicity and low cost of adding new instructions to an extensible CPU, the customers which desire or need application specific instructions are able to add one or more application specific instructions while still maintaining a reasonable cost. In addition, if new algorithms are developed or become popular in the future, new instructions can be added to the extensible CPU in order to implement the new algorithms in a simple and cost effective manner.

Using the present invention, a prior art CPU system-level architecture, namely the MC68HC05 CPU architecture in the illustrated embodiment, can be modified and made extensible so that no significant circuit changes will be required in order to add new instructions. Instead, the addition of certain predetermined circuitry will be required in order to perform the new instructions. The resulting extensible CPU, named the MC68HC08, is object code compatible with the existing MC68HC05 family of MCUs.

A prior art CPU can be made extensible by making the following modifications: (1) allowing more than one control unit to drive the control signals into the execution unit; (2) locating all of the registers in the programmer's model in the execution unit (including the condition code register); (3) modifying the state sequencer circuitry; and (4) adding a few control signals. Once the CPU is extensible, additional instructions can be added without any significant changes to the extensible CPU circuitry.

New instructions can be added merely by adding a second control unit 64 and a second state sequencer 68. Note that most of the second control unit 64 can be a duplicate of the original control unit 54, and that some of the second state sequencer 68 can be a duplicate of the original state sequencer 58. Note also that both the original control unit 54 and the second control unit 64 have complete access to all of the resources within the execution unit 56.

In addition to adding new instructions which utilize the existing resources of the execution unit 156, new resources can also be added to the execution unit itself. The execution unit's internal buses are routed to the physical edge of the execution unit. Thus an execution unit extension 153 can be added and directly coupled to one or more of the execution unit's internal buses in order to increase the functionality of the execution unit by adding registers, another arithmetic logic unit (ALU), special function circuitry, or any other desired circuitry.

As a result, the present invention allows a prior art CPU to be made extensible so that circuitry can be easily added to the extensible CPU in order to meet differing customer needs, both in the present and in the future. As a result, the cost for individual customer flexibility has been significantly reduced.

DESCRIPTION OF THE FIGURES

The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

The term "bus" will be used to refer to a plurality of signals which may be used to transfer one or more various types of information, such as data, addresses, control, or status.

Figure 1:
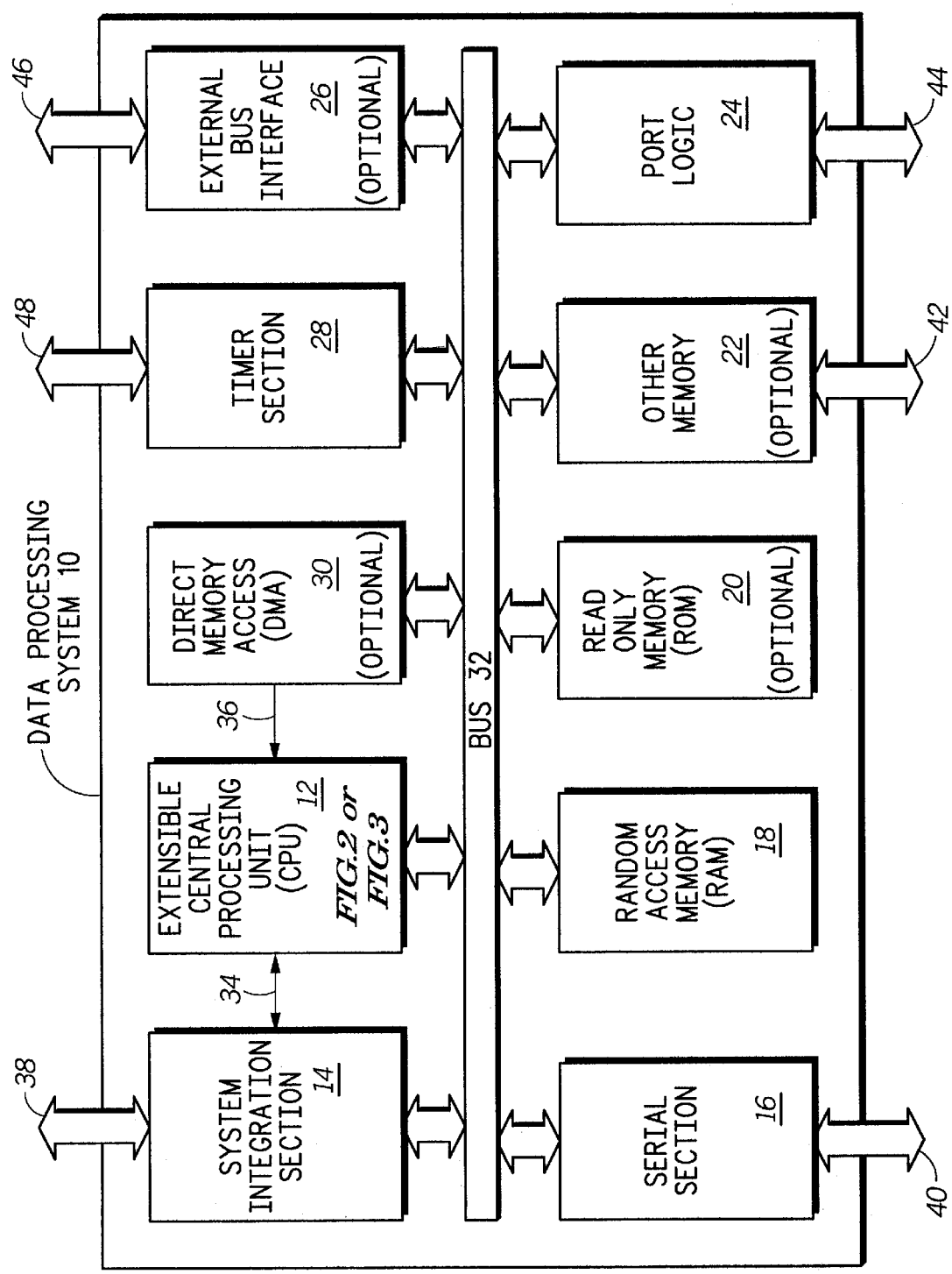
FIG. 1 illustrates one embodiment of a data processing system 10. Data processing system circuitry 10 has extensible central processing unit (CPU) circuitry 12, a system integration section of circuitry 14, a serial section of circuitry 16, random access memory (RAM) circuitry 18, read only memory (ROM) circuitry 20, other memory circuitry 22 (e.g. electrically erasable programmable read only memory, EEPROM), port logic circuitry 24, external bus interface circuitry 26, a timer section of circuitry 28, and direct memory access (DMA) circuitry 30, each of which is bi-directionally coupled to bus circuitry 32. Extensible CPU 12 and system integration section 14 are bi-directionally coupled to each other by way of bus circuitry 34. Extensible CPU 12 is coupled to DMA 30 by way of bus circuitry 36.

System integration section 14 can receive and transmit signals external to data processing system 10 by way of integrated circuit pins 38. Serial section 16 can receive and transmit signals external to data processing system 10 by way of integrated circuit pins 40. Depending upon the type of memory, other memory 22 may optionally receive and transmit signals external to data processing system 10 by way of integrated circuit pins 42. Port logic 24 can receive and transmit signals external to data processing system 10 by way of integrated circuit pins 44. External bus interface 26 can receive and transmit signals external to data processing system 10 by way of integrated circuit pins 46. And timer section 28 can receive and transmit signals external to data processing system 10 by way of integrated circuit pins 48.

Figure 2:
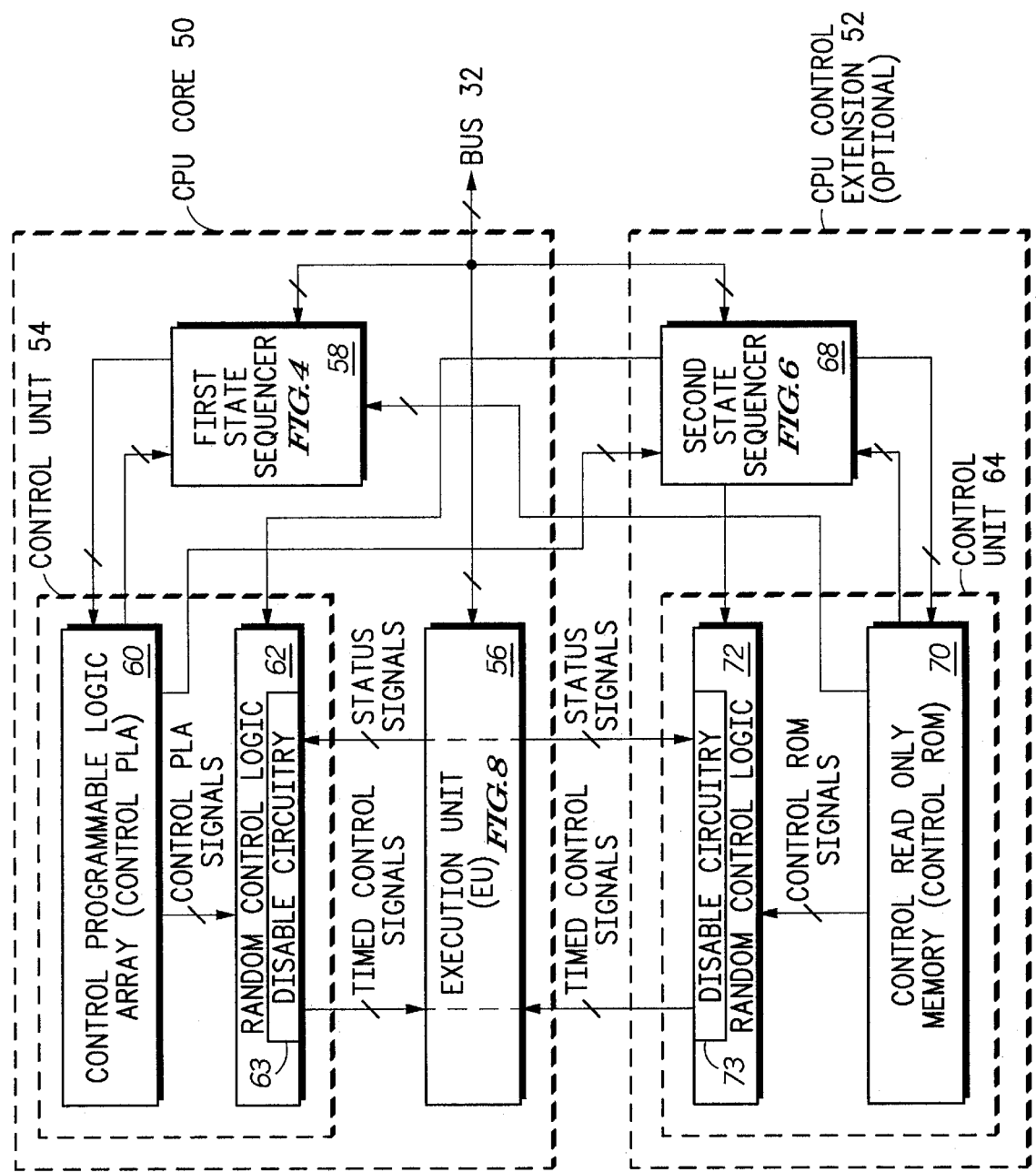

FIG. 2 illustrates, in block diagram form, an extensible central processing unit (CPU) 12 of FIG. 1 in accordance with one embodiment of the present invention. Extensible CPU 12 is divided into two major portions, namely CPU core circuitry 50 and CPU control extension circuitry 52.

CPU core 50 has control unit circuitry 54, execution unit (EU) circuitry 56, and first state sequencer circuitry 58. Control unit 54 has control programmable logic array (control PLA) circuitry 60 which transfers Control PLA Signals to random control logic circuitry 62. Random control logic 62 transfers Timed Control Signals to execution unit 56. Random control logic 62 receives Status Signals from execution unit 56. Control PLA 60 transfers signals to and receives signals from first state sequencer 58. Random control logic 62 includes disable circuitry 63.

CPU control extension 52 has control unit circuitry 64 and second state sequencer circuitry 68. Control unit 64 has control read only memory (control ROM) circuitry 70 which transfers Control ROM Signals to random control logic circuitry 72. Random control logic 72 transfers Timed Control Signals to execution unit 56. Random control logic 72 receives Status Signals from execution unit 56. Random control logic 72 includes disable circuitry 73.

Control ROM 70 transfers signals to and receives signals from second state sequencer 68. Control ROM 70 also transfers signals to first state sequencer 58. Second state sequencer 68 transfers one or more signals to random control logic 62; second state sequencer 68 also transfers signals to random control logic 72. Second state sequencer 68 receives signals from control PLA 60.

Execution unit 56 is bi-directionally coupled to bus 32. First state sequencer 58 and second state sequencer 68 are coupled to receive instructions from bus 32.

Figure 3:
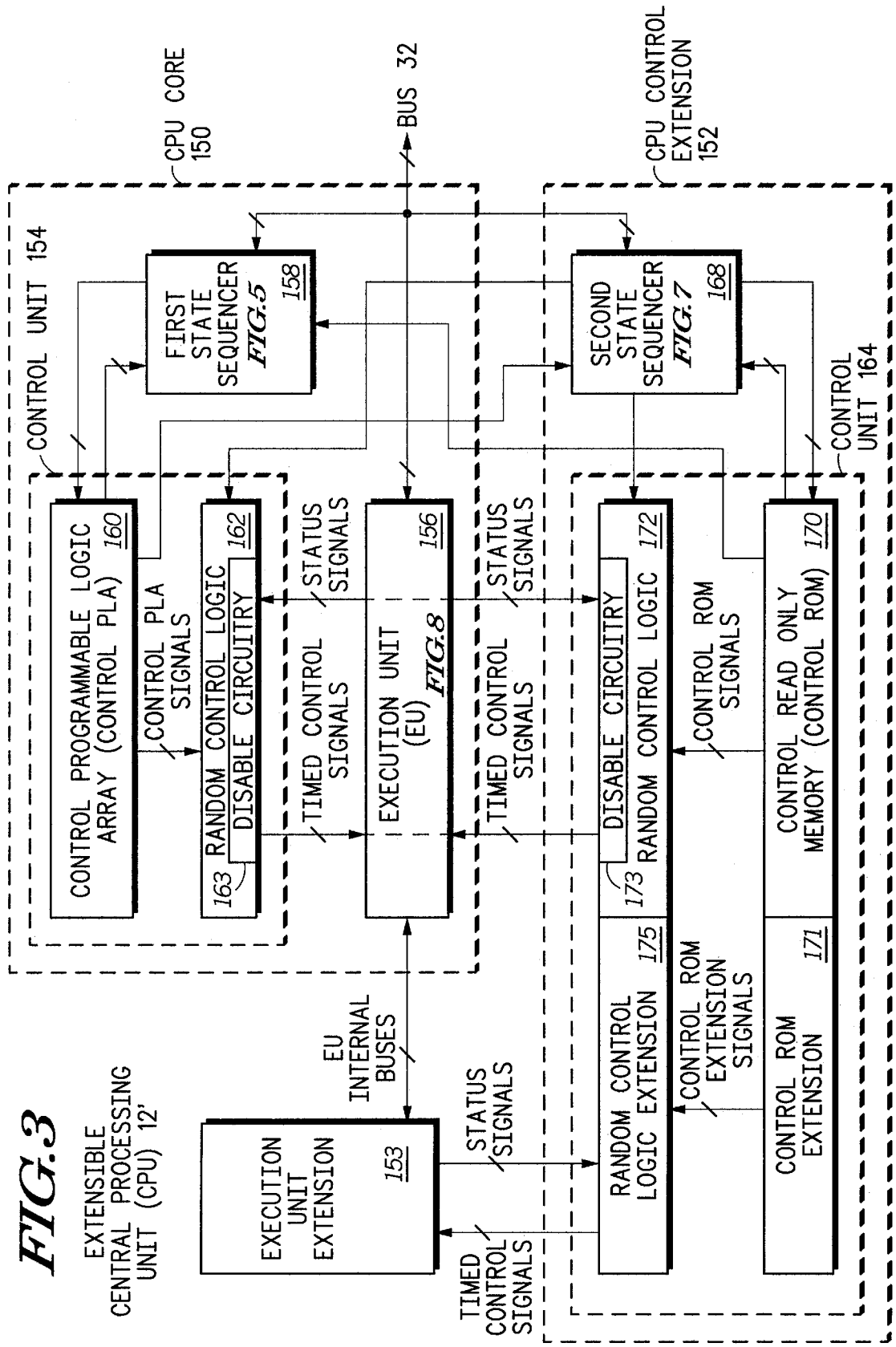

FIG. 3 illustrates, in block diagram form, an extensible central processing unit (CPU) 12' of FIG. 1 in accordance with one embodiment of the present invention. Extensible CPU 12' is divided into three major portions, namely CPU core circuitry 150, CPU control extension circuitry 152, and execution unit extension circuitry 153.

CPU core 150 has control unit circuitry 154, execution unit (EU) circuitry 156, and first state sequencer circuitry 158. Control unit 154 has control programmable logic array (control PLA) circuitry 160 which transfers Control PLA Signals to random control logic circuitry 162. Random control logic 162 transfers Timed Control Signals to execution unit 156. Random control logic 162 receives Status Signals from execution unit 156. Control PLA 160 transfers signals to and receives signals from first state sequencer 158. Random control logic 162 includes disable circuitry 163.

CPU control extension 152 has control unit circuitry 164 and second state sequencer circuitry 168. Control unit 164 has control read only memory (control ROM) circuitry 170 which transfers Control ROM Signals to random control logic circuitry 172. In addition, control unit 164 has control read only memory (control ROM) extension circuitry 171 which transfers Control ROM Extension Signals to random control logic extension circuitry 175. Random control logic 172 transfers Timed Control Signals to execution unit 156. In addition, random control logic extension 175 transfers Timed Control Signals to execution unit extension 153. Random control logic 172 receives Status Signals from execution unit 156. In addition, random control logic extension 175 receives Status Signals from execution unit extension 153. Random control logic 172 includes disable circuitry 173.

Control ROM 170 transfers signals to and receives signals from second state sequencer 168. Control ROM 170 also transfers signals to first state sequencer 158. Second state sequencer 168 transfers one or more signals to random control logic 162; second state sequencer 168 also transfers signals to random control logic 172. Second state sequencer 168 receives signals from control PLA 160.

Execution unit 156 is bi-directionally coupled to bus 32. First state sequencer 158 and second state sequencer 168 are coupled to receive instructions from bus 32. In addition, execution unit extension 153 is coupled to execution unit 156 by means of one or more execution unit (EU) internal buses.

Figure 4:
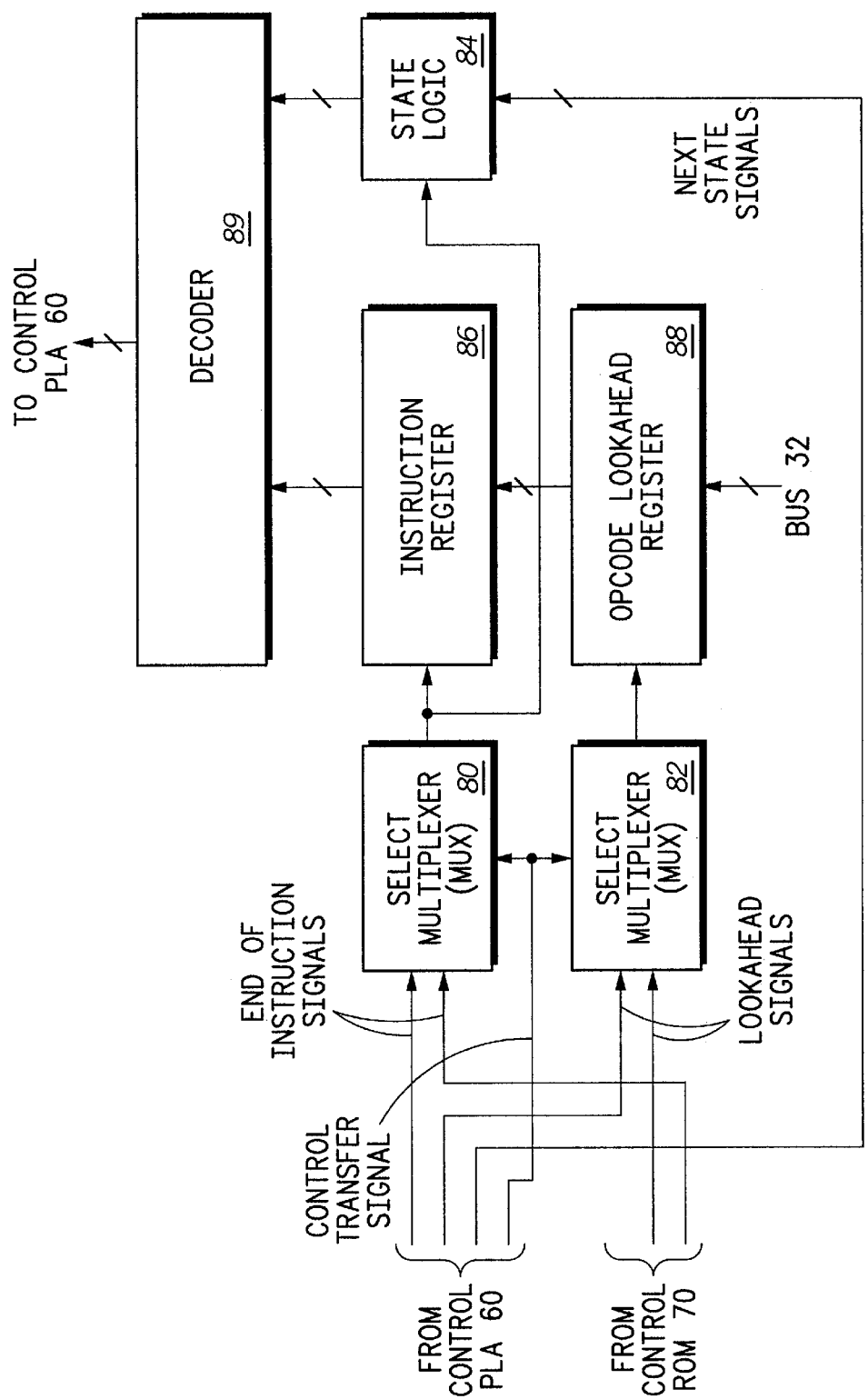

FIG. 4 illustrates, in block diagram form, a first state sequencer 58 of FIG. 2 in accordance with one embodiment of the present invention. Select multiplexer (MUX) circuitry 80 receives an End Of Instruction Signal from control PLA 60 and an End Of Instruction Signal from control ROM 70. Select multiplexer (MUX) circuitry 82 receives a Lookahead Signal from control PLA 60 and a Lookahead Signal from control ROM 70. State logic circuitry 84 receives Next State Signals from control PLA 60.

MUX 80 and MUX 82 each receive a Control Transfer Signal from control PLA 60. The output of MUX 80 is coupled to a control input of instruction register circuitry 86 and is coupled to state logic 84. The output of MUX 82 is coupled to a control input of opcode lookahead register circuitry 88. Opcode lookahead register 88 is coupled to bus 32 in order to receive instructions. Instruction register 86 is coupled to opcode lookahead register 88 in order to receive instructions.

Decoder circuitry 89 is coupled to instruction register 86 in order to receive instructions. Decoder 89 is coupled to state logic 84 in order to receive state information. Decoder 89 generates control signals which go control PLA 60. Additionally, first state sequencer 58 requires ting signals (not shown).

Figure 5:
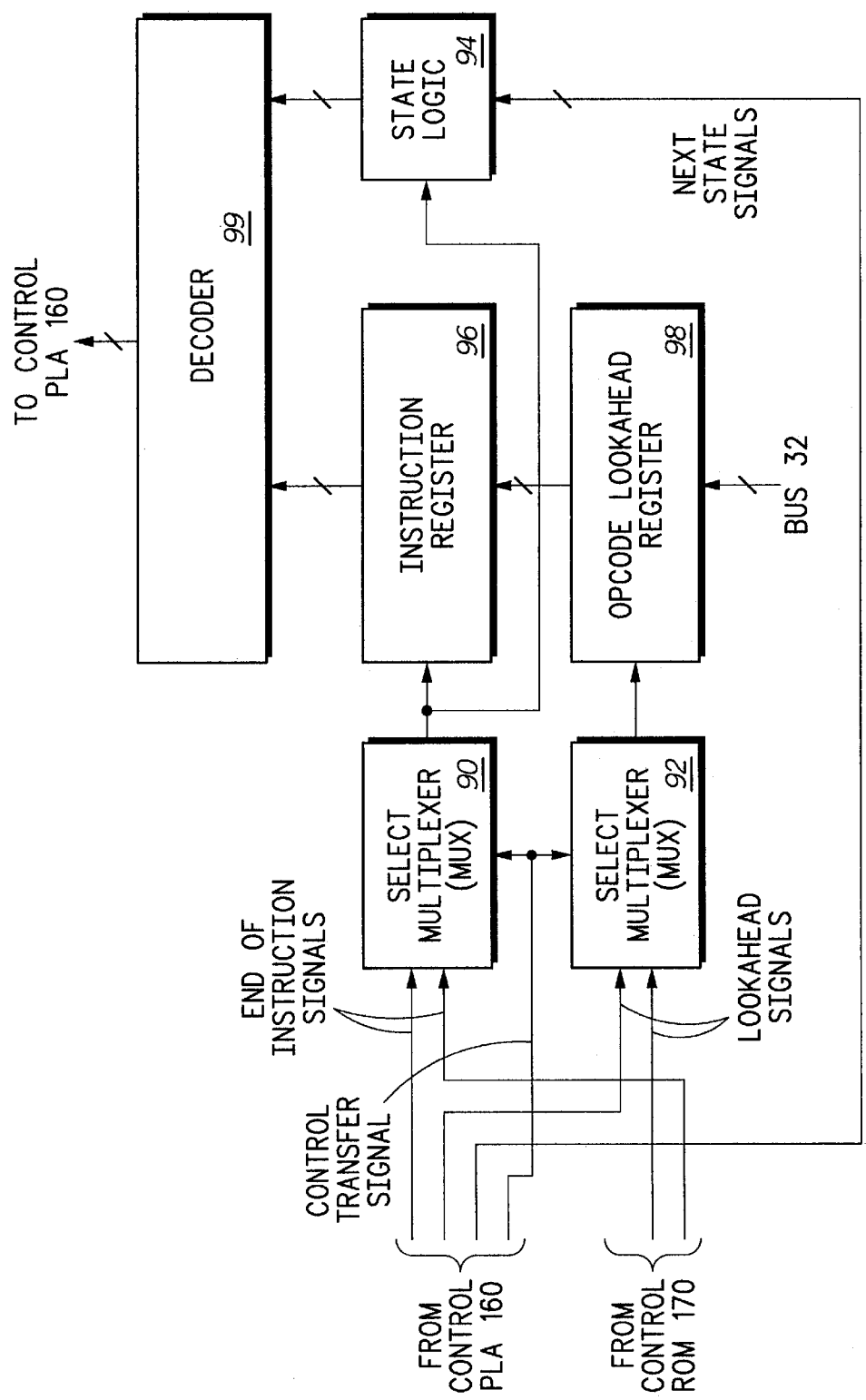

FIG. 5 illustrates, in block diagram form, a first state sequencer 158 of FIG. 3 in accordance with one embodiment of the present invention. Select multiplexer (MUX) circuitry 90 receives an End Of Instruction Signal from control PLA 160 and an End Of Instruction Signal from control ROM 170. Select multiplexer (MUX) circuitry 92 receives a Lookahead Signal from control PLA 160 and a Lookahead Signal from control ROM 170. State logic circuitry 94 receives Next State Signals from control PLA 160.

MUX 90 and MUX 92 each receive a Control Transfer Signal from control PLA 160. The output of MUX 90 is coupled to a control input of instruction register circuitry 96 and is coupled to state logic 94. The output of MUX 92 is coupled to a control input of opcode lookahead register circuitry 98. Opcode lookahead register 98 is coupled to bus 32 in order to receive instructions. Instruction register 96 is coupled to opcode lookahead register 98 in order to receive instructions.

Decoder circuitry 99 is coupled to instruction register 96 in order to receive instructions. Decoder 99 is coupled to state logic 94 in order to receive state information. Decoder 99 generates control signals which go control PLA 160. Additionally, first state sequencer 158 requires timing signals (not shown).

Figure 6:
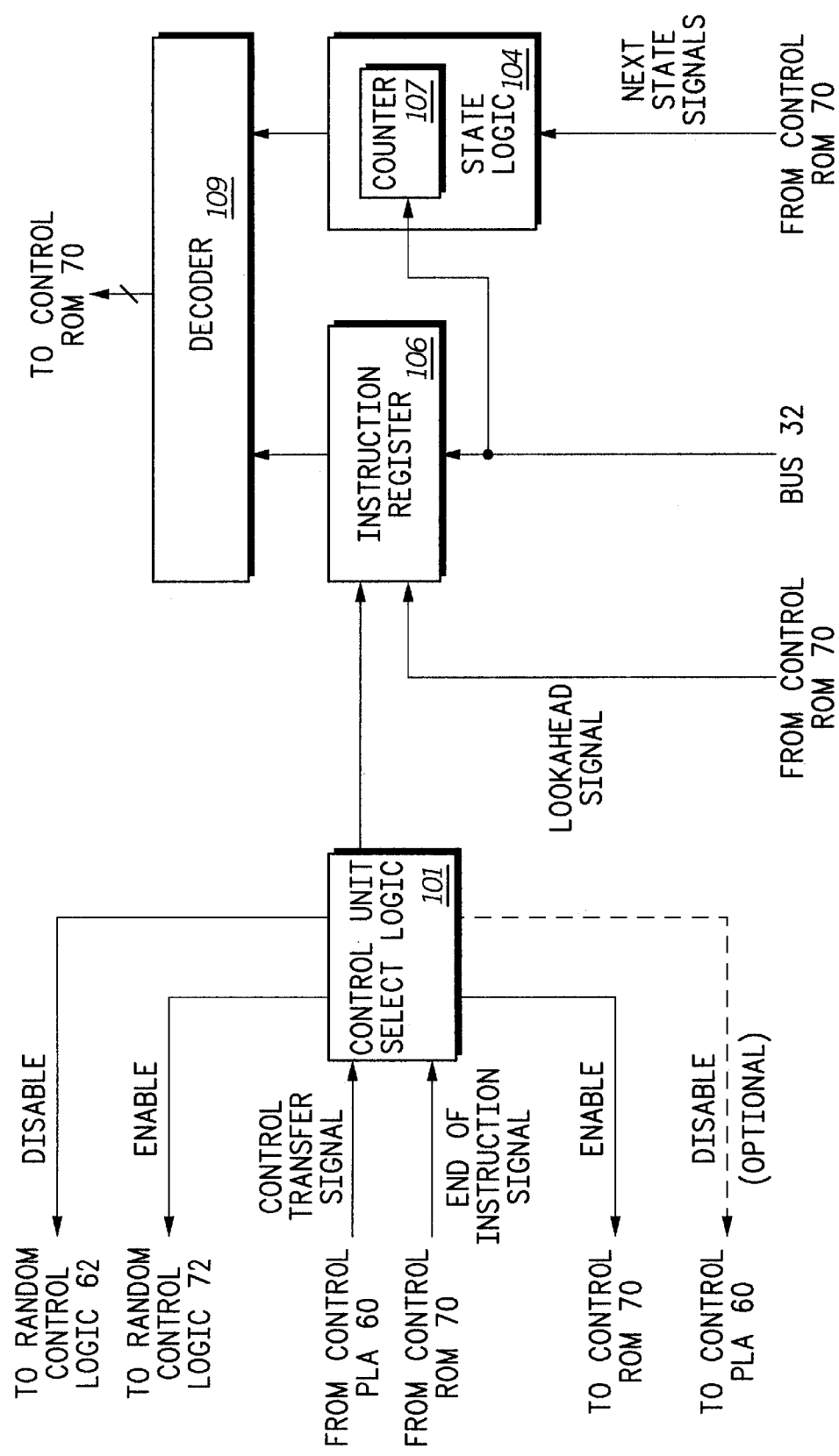

FIG. 6 illustrates, in block diagram form, a second state sequencer 68 of FIG. 2 in accordance with one embodiment of the present invention. Control unit select logic circuitry 101 receives a Control Transfer Signal from control PLA 60 and an End Of Instruction Signal from control ROM 70. Control unit select logic 101 provides a Disable Signal to random control logic 62, an Enable Signal to random control logic 72, and an Enable Signal to control ROM 70. Optionally, control unit select logic 101 may provide a Disable Signal to control PLA 60.

State logic circuitry 104 includes counter circuitry 107. State logic 104 receives Next State Signals from control ROM 70. Instruction register circuitry 106 receives a Lookahead Signal from control ROM 70. Instruction register 106 is coupled to bus 32 in order to receive instructions. Counter 107 is coupled to bus 32 so that counter 107 can be written by way of bus 32. Decoder circuitry 109 is coupled to instruction register 106 in order to receive instructions. Decoder 109 is coupled to state logic 104 in order to receive state information. Decoder 109 generates control signals which go control ROM 70. Additionally, second state sequencer 68 requires timing signals (not shown). Control unit select logic 101 is coupled to instruction register 106.

Figure 7:
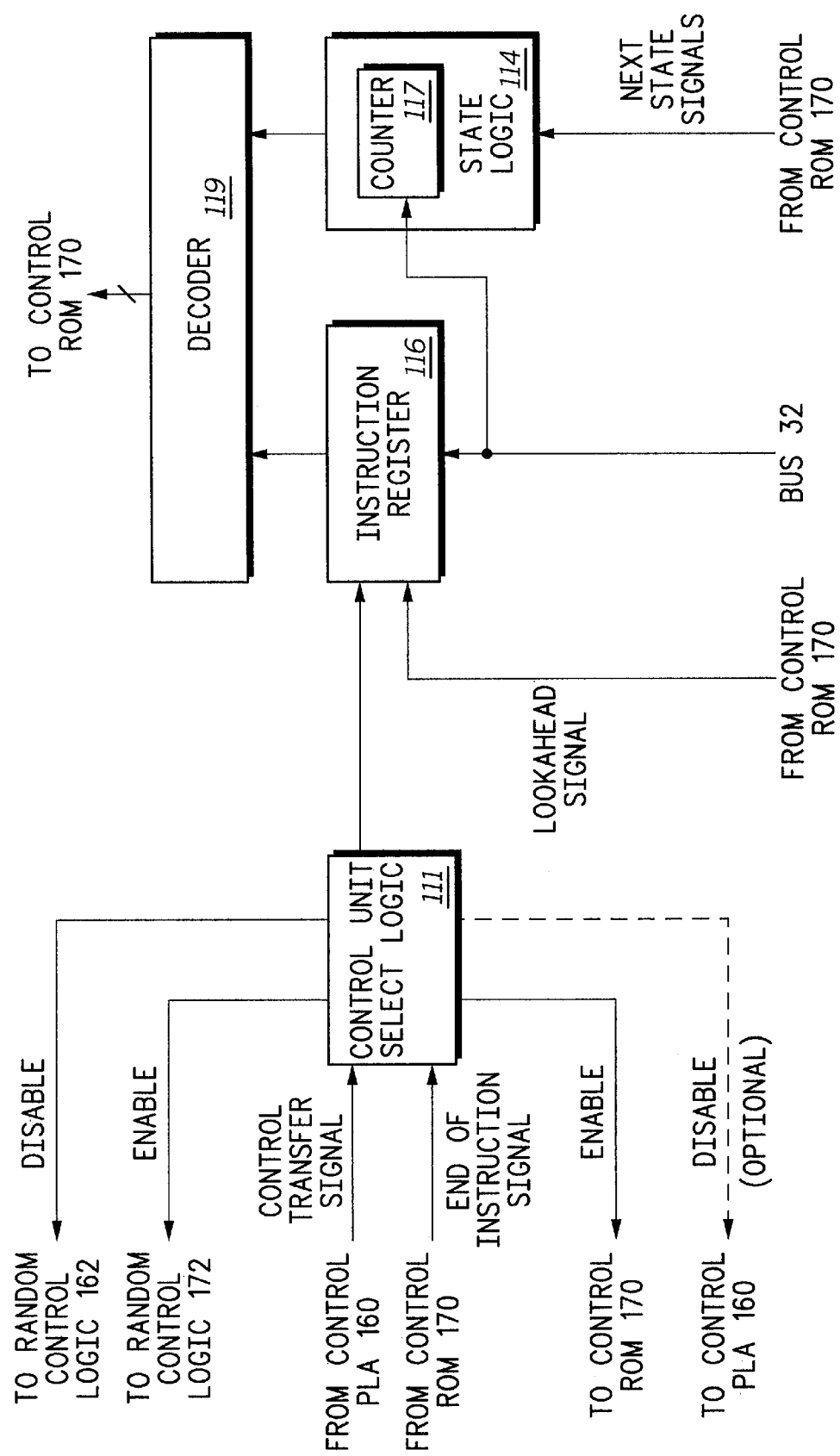

FIG. 7 illustrates, in block diagram form, a second state sequencer 168 of FIG. 3 in accordance with one embodiment of the present invention. Control unit select logic circuitry 111 receives a Control Transfer Signal from control PLA 160 and an End Of Instruction Signal from control ROM 170. Control unit select logic 111 provides a Disable Signal to random control logic 162, an Enable Signal to random control logic 172, and an Enable Signal to control ROM 170. Optionally, control unit select logic 111 may provide a Disable Signal to control PLA 160.

State logic circuitry 114 includes counter circuitry 117. State logic 114 receives Next State Signals from control ROM 170. Instruction register circuitry 116 receives a Lookahead Signal from control ROM 170. Instruction register 116 is coupled to bus 32 in order to receive instructions. Counter 117 is coupled to bus 32 so that counter 117 can be written by way of bus 32. Decoder circuitry 119 is coupled to instruction register 116 in order to receive instructions. Decoder 119 is coupled to state logic 114 in order to receive state information. Decoder 119 generates control signals which go control ROM 170. Additionally, second state sequencer 168 requires timing signals (not shown). Control unit select logic 111 is coupled to instruction register 116.

Figure 8:
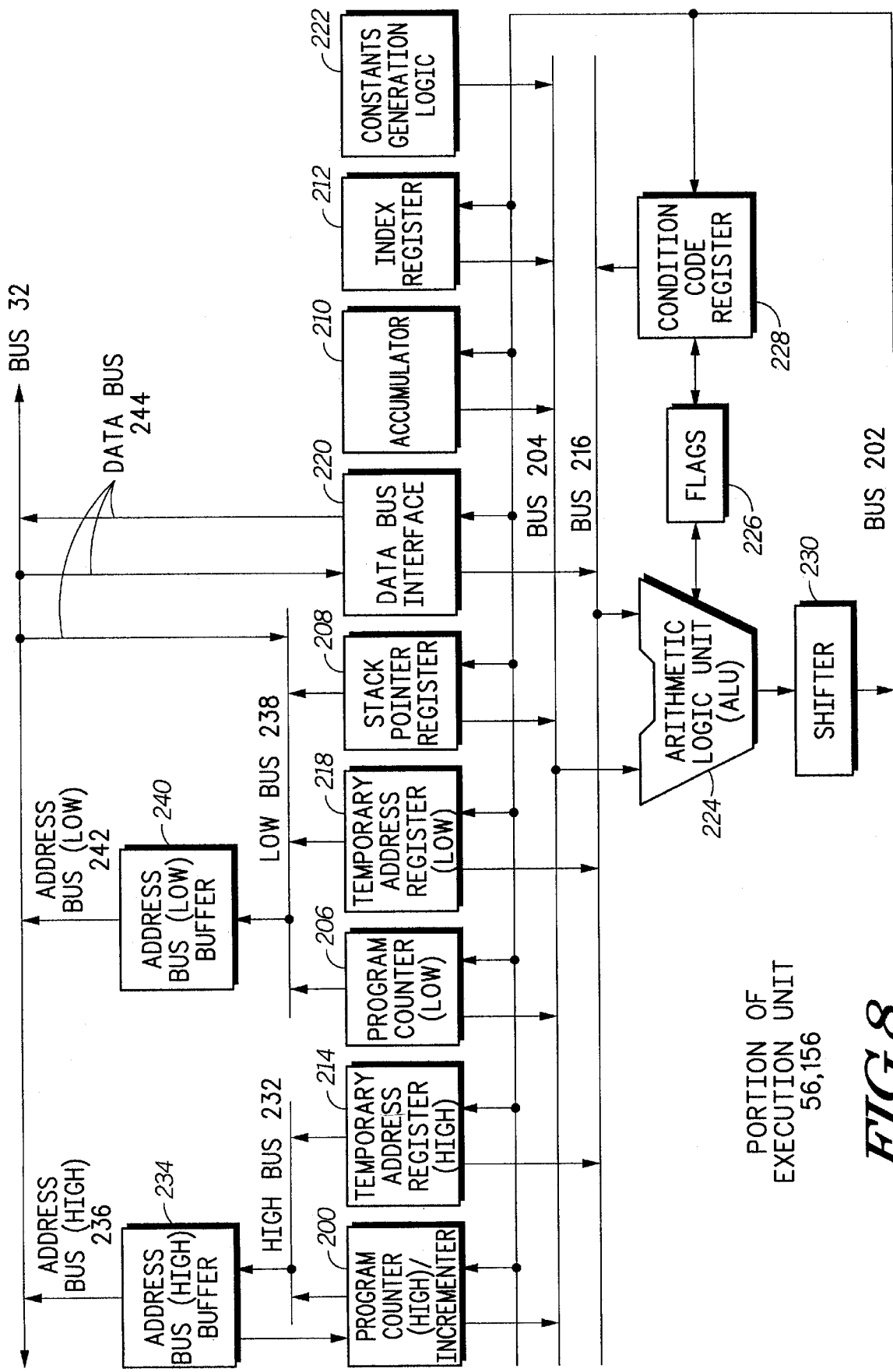

FIG. 8 illustrates one embodiment of a portion of execution unit 56 of FIG. 2. Likewise, FIG. 8 illustrates one embodiment of a portion of execution unit 156 of FIG. 3. Control unit select logic 101 is coupled to instruction register 106.

Program counter (high)/incrementer register circuit 200 receives information from bus 202 and provides information to bus 204. Program counter (low) register circuit 206 receives information from bus 202 and provides information to bus 204. Stack pointer register circuit 208 receives information from bus 202 and provides information to bus 204. Accumulator register circuit 210 receives information from bus 202 and provides information to bus 204. Index register circuit 212 receives information from bus 202 and provides information to bus 204.

Temporary address register (high) circuit 214 receives information from bus 202 and provides information to bus 216. Temporary address register (low) circuit 218 receives information from bus 202 and provides information to bus 216. Data bus interface circuitry 220 receives information from bus 202 and provides information to bus 216. Constants generation logic circuit 222 provides information to bus 204.

Arithmetic logic unit (ALU) 224 receives data from bus 204 and from bus 216. ALU 224 is bi-directionally coupled to flags circuitry 226. Flags circuitry 226 is bi-directionally coupled to condition code register 228. Condition code register 228 receives information from bus 202 and provides information to bus 216. The output of ALU 224 is coupled to shifter circuitry 230. Shifter 230 provides information to bus 202.

Program counter (high) /incrementer register 200 and temporary address register (high) 214 each provide information to high bus 232. Address bus (high) buffer circuitry 234 receives information from high bus 232 and provides information to program counter (high)/incrementer register 200. Address bus (high) buffer 234 is coupled to address bus (high) 236. Address bus (high) 236 is coupled to bus 32.

Program counter (low) register 206, temporary address register (low) 218, and stack pointer register 208 each provide information to low bus 238. Address bus (low) buffer circuitry 240 receives information from low bus 238. Address bus (low) buffer 240 is coupled to address bus (low) 242. Address bus (low) 242 is coupled to bus 32.

Low bus 238 receives information from data bus 244. Data bus interface 220 receives information from and provides information to data bus 244. Data bus 244 is coupled to bus 32.

OPERATION OF THE PREFERRED EMBODIMENT

The present invention allows a CPU to be made extensible so that it is easy to add circuitry and so that very little existing circuitry has to be changed in order to implement new instructions or algorithms.

Referring to FIG. 1, data processing system 10 illustrates one possible MCU within an MCU family. Because MCUs in the same family generally have different on-board peripherals, other embodiments of data processing system 10 may not have ROM 20, may not have external bus interface 26, and may not have DMA 30. In fact, other embodiments of data processing system 10 may have fewer, more, or different peripherals than those illustrated in FIG. 1.

In the past, MCUs within a particular family almost always used the exact same CPU. The present invention allows MCUs within a particular family to use different extensible CPUs 12 which are all related by being extensions of the same CPU core 50. FIG. 2 illustrates one possible embodiment of an extensible CPU 12. FIG. 3 illustrates a second possible embodiment of an extensible CPU 12, namely extensible CPU 12'.

Referring to FIG. 2, a family of MCUs based on the extensible CPU 12 illustrated in FIG. 2 will all have the same CPU core 50. One such family of MCUs based on one embodiment of CPU core 50 is called the MC68HC08 family. CPU core 50 is a modification of a prior art CPU architecture, namely the MC68HC05 CPU architecture. Other embodiments of the present invention could use different CPU architectures. Due to the fact that it has been modified, CPU core 50 is now extensible, unlike the prior art.

CPU control extension 52 illustrates one embodiment of the additional circuitry which may be added to CPU core 50 in order to implement a new instruction or algorithm. CPU control extension 52 did not exist in the prior art MC68HC05 CPU. The specific modifications which were made to the prior art MC68HC05 CPU in order to make it extensible will now be discussed.

Starting with execution unit 56, with one exception, execution unit 56 may be identical to the prior art at the individual logic gate level. That one exception is the condition code register 228 (see FIG. 8). In the prior art MC68HC05 CPU, the condition code register was physically located in the random control logic portion of the control unit because the condition code register contained status information on the most recent state of the execution unit. The control unit needed this status information in order to determine what Timed Control Signals to assert to control the execution unit during the next state. For example, the control unit needed to know the logic state of the zero bit in the condition code register in order to determine how to control the execution unit for certain conditional branch instructions.

However, in order to make CPU 12 extensible, control unit 64 has to have access to all of the status information of execution unit 56. By moving the condition code register 228 into execution unit 56, execution unit 56 now contains all of the registers in the programmer's model, and thus all of the status registers and status information for execution unit 56. Thus a second control unit 64 has direct access to all of the status information of execution unit 56 directly from execution unit 56. In extensible CPU 12, both control unit 54 and control unit 64 have access to the same identical set of Status Signals from execution unit 56; and the Status Signals include status information from condition code register 228 in execution unit 56.

At the layout level, execution unit 56 circuitry must be physically arranged on a semiconductor integrated circuit so that the complete set of Timed Control Signals and the complete set of Status Signals are available for both control unit 54 and control unit 64. That is, all of the Timed Control Signals and all of the Status Signals must be physically routed so that they can be coupled to both control unit 54 and control unit 64.

In the illustrated embodiment of the present invention, the conductors transferring the Timed Control Signals are each coupled to control unit 54 at one end, are each routed through execution unit 56, and are each routed external to execution unit 56 at the other end, regardless of whether or not CPU control extension 52 has been implemented. In the prior art, only one control unit, namely control unit 54, had to be coupled to the Timed Control Signals and to the Status Signals; and thus the conductors transferring the Timed Control Signals only had to be routed external to execution unit 56 at the one end.

The specific modifications which were made to the prior art control unit in order to form control unit 54 will now be discussed. As was previously mentioned, condition code register 228 was removed from random control logic 62. In addition, disable circuitry 63 was added to random control logic 62 in order to allow the Timed Control Signals to be disabled. When the Timed Control Signals are disabled, they are not transferred to execution unit 56 and therefore have no effect on execution unit 56.

Disable circuitry 63 is controlled by a signal generated by second state sequencer 68. In one embodiment of the present invention, disable circuitry 63 includes one transmission gate (not shown) for each Timed Control Signal. When CPU core 50 is used without CPU control extension 52, the transmission gates (not shown) are always enabled so that the Timed Control Signals are always transferred to execution unit 56. When CPU core 50 is used with CPU control extension 52, the transmission gates (not shown) are either enabled or disabled based upon whether a Disable Signal from second state sequencer 68 is asserted or negated (see FIG. 6).

Note that in one embodiment of the present invention, disable circuitry 63 includes a latch (not shown) which latches the asserted state of the Disable Signal from second state sequencer 68. Then when a timing signal (not shown) is asserted, the latch enables the transmission gates which allow certain of the Timed Control Signals to be transferred to the stack pointer register 208 and the program counter (high)/incrementer 200 in execution unit 56 (see FIG. 8). The latch (not shown) is thus used to delay the effect of the Disable Signal on execution unit 56 for a few of the Timed Control Signals. Other than these differences, random control logic 62 may be identical to the prior art random control logic.

Control PLA 60 is the same as the prior art with the addition of: (1) a new input state from first state sequencer 58 (for a special control transfer instruction); (2) a few output Control PLA Signals; and (3) a few logical AND terms and/or logical OR terms within control PLA 60. The additional signals and circuitry have to do with the transfer of control of execution unit 56 between the two control units 54 and 64. The transfer of control of execution unit 56 between the two control units 54 and 64 will be discussed in detail herein below.

Referring to FIG. 4, the specific modifications which were made to the prior art state sequencer in order to form first state sequencer 58 will now be discussed. Like the prior art, first state sequencer 58 in conjunction with control PLA 60 functions as a state machine by determining the next state of CPU core 50 based upon both the present state of CPU core 50 and upon the present instruction received by way of bus 32. First state sequencer 58 is capable of handling the same state transitions as the prior art. In addition, first state sequencer 58 is also capable of handling the state transitions which are involved in the transfer of control of execution unit 56 between the two control units 54 and 64.

Still referring to FIG. 4, the prior art did not have MUX 80 and MUX 82. In the prior art, instead of the output from MUX 80 being used to indicate when instruction register 86 is to be loaded, an output signal from control PLA 60 was used. Likewise, instead of the output from MUX 82 being used to indicate when opcode lookahead register 88 is to be loaded, an output signal from control PLA 60 was used. State logic 84 is capable of handling a new instruction, namely the special control transfer instruction, which the prior art did not have. This new instruction is involved in the transfer of control of execution unit 56 between the two control units 54 and 64. Unlike the prior art, decoder 89 and control PLA 60 are also capable of handling this same new special control transfer instruction.

In conclusion, the circuit modifications made to the prior art MC68HC05 CPU in order to make it extensible require only a small amount of additional circuitry in relation to the existing circuitry. However, the benefits reaped from these circuit changes are extremely important. As a result of these circuit changes, the functionality of the same CPU core 50 can be extended by adding different CPU control extension circuits 52 which have been customized to various customer requirements.

The operation of extensible CPU 12 will now be discussed (see FIG. 2). First, extensible CPU 12 may include only CPU core 50 without CPU control extension 52. For example, CPU core 50 alone may be used as the extensible CPU 12 in data processing system 10 illustrated in FIG. 1. However, CPU core 50 may also be used in conjunction with various customized embodiments of CPU control extension 52. The inclusion of CPU control extension 52 is one way in which extensible CPU 12 may be extended.

The block diagram illustrated in FIG. 2 is just one possible embodiment of CPU control extension 52. CPU control extension 52 could be designed in any manner, as long as CPU control extension 52 generated the Timed Control Signals to properly control execution unit 56, and as long as CPU control extension 52 had circuitry which allowed the control of execution unit 56 to be transferred back and forth between the two sources of the Timed Control Signals.

The illustrated embodiment of CPU core 50 consists of two basic portions of circuitry. The first portion, including control unit 54 and first state sequencer 58, receives instructions by way of bus 32 and generates Timed Control Signals that are used to control execution unit 56. This first portion of control circuitry may be implemented in a variety of ways. The second portion, execution unit 56, receives the Timed Control Signals and uses these Timed Control Signals to actually execute the instructions. Execution unit 56 may likewise be implemented in a variety of ways.

The embodiment of CPU control extension 52 illustrated in FIG. 2 is a simple way to build CPU control extension 52. With a few circuit changes, CPU control extension 52 can be implemented as a mirror image of control unit 54 and first state sequencer 58. The circuitry in random control logic 72 can be implemented as an exact copy of the circuitry in random control logic 62. The input control signals to random control logic 72, namely the Control ROM Signals, come from control ROM 70 and are determined by the customized ROM pattern which is stored in ROM 70. Different customers can use different ROM patterns which cause execution unit 56 to perform new instructions.

Referring to FIG. 2 and FIG. 4, first state sequencer 58 in conjunction with control PLA 60 function primarily as a state machine for CPU core 50. In this capacity, first state sequencer 58 receives instructions from bus 32. First state sequencer 58 then decodes (using decoder 89) both the present instruction to be executed (from instruction register 86), as well as the present internal state of CPU core 50 (from state logic 84). First state sequencer 58 then outputs signals from decoder 89 which are the inputs to control PLA 60.

ROM 70 in CPU control unit 64 serves a similar function as control PLA 60 in control unit 54. Control PLA 60 generates the input signals for random control logic 62 and generates control transfer information for first state sequencer 58 and for second state sequencer 68. ROM 70 generates the input signals for random control logic 72 and generates control transfer information for first state sequencer 58 and for second state sequencer 68.

Note that control PLA 60 and ROM 70 could be implemented as any type of programmable array, including any type of memory or any type of programmable logic array. Control PLA 60 and ROM 70 could even be implemented as random logic and combined with the remaining random control logic circuitry in their respective control units 54 and 64.

A programmable logic array (PLA) generally requires less semiconductor area than a read only memory (ROM); however, it is simpler and faster to customize a ROM than it is to customize a PLA. Because the same control PLA 60 will be used for different versions of extensible CPU 12, it may be advantageous to implement control PLA 60 as a PLA in order to conserve semiconductor area. However, because control ROM 70 must have different programming for different versions of extensible CPU 12, it may be simpler and faster to implement control ROM 70 as a ROM.

The Timed Control Signals provide execution unit 56 with all of the required control information. Bus 32 is used as an address and data path to read and write the registers located in execution unit 56. Extensible CPU 12 has two distinct control units, namely control unit 54 and control unit 64. Each of the two control units 54 and 64 is fully capable of generating the same Timed Control Signals used to control execution unit 56. Likewise, each of the two control units 54 and 64 has complete access to all of the resources within execution unit 56.

Consequently control unit 54, by itself, is fully capable of controlling all of execution unit 56; likewise control unit 64, by itself, is fully capable of controlling all of execution unit 56. In fact, in some embodiments of extensible CPU 12, control unit 54 and control unit 64 are each coupled to opposite ends of the same Timed Control Signal conductors which are routed through execution unit 56 and then routed to each control unit 54 and 64.

In the illustrated embodiment of the present invention, a special control transfer instruction is used to transfer control of execution unit 56 from control unit 54 to control unit 64. In the illustrated embodiment, after control unit 64 receives control of execution unit 56, CPU control extension 52 performs one instruction before automatically returning control of execution unit 56 to control unit 54. Thus every time a user of extensible CPU 12 desires to use CPU control extension 52 to execute a custom instruction, the user must include the special control transfer instruction followed by the custom instruction in his or her software program.

Although in this embodiment, CPU control extension 52 can only execute one custom instruction before control is automatically returned to control unit 54, this one instruction can include any number of execution unit cycles. Thus a customer can define an entire subroutine of normal instructions to be one single custom instruction. A customer can also define multiple custom instructions having varying numbers of execution unit cycles by storing the proper corresponding control information in control ROM 70.

Note that an execution unit cycle is defined by the amount of time which is required to carry out the following three steps in execution unit 56 (see FIG. 8): (1) transfer one or more values to ALU 224; (2) use ALU 224 to perform an arithmetic or logical operation; and (3) transfer the resulting value from ALU 224 to a register. In one embodiment of the present invention, two execution unit cycles can be performed for every bus cycle of bus 32.

A bit field within each custom instruction can be used to designate which custom instruction is to be executed. In one embodiment of the present invention, the special control transfer instruction includes two bytes: the first byte is the opcode which is used only for the special control transfer instruction (which is the same for each custom instruction); and the second byte is the starting address in control ROM 70 (which may be different for each custom instruction).

In one embodiment of the present invention, the special control transfer instruction has the same effect on execution unit 56 as a "no operation" (NOP) instruction. Likewise, the last two execution unit cycles of each custom instruction controlled by control unit 64 have the same effect on execution unit 56 as a NOP instruction. The NOP instruction, the special control transfer instruction, and the last portion of each custom instruction each consists of two execution unit cycles. During the first execution unit cycle, the incrementing of program counter register 200, 206 is begun. During the second execution unit cycle, the incrementing of program counter register 200, 206 is completed. Except for the program counter register 200, 206, execution unit 56 is not affected during execution of the special control transfer instruction, even though the Timed Control Signals are being driven.

Although there are numerous implementations which could be used to pass control of execution unit 56 using a special control transfer instruction, the implementation illustrated in FIGS. 2, 4, and 6 will now be discussed. Control unit select logic 101 in second state sequencer 68 (see FIG. 6) is responsible for enabling and disabling the appropriate control units 54 and 64. In the illustrated embodiment, the special control transfer instruction is used to initiate the transfer of control from control unit 54 to control unit 64, and an End of Instruction Signal from control ROM 70 is used to initiate the transfer of control from control unit 64 back to control unit 54 after one custom instruction has been performed.

In the illustrated embodiment, control unit select logic 101 provides separate control signals to enable or disable random control logic 62, random control logic 72, control ROM 70, and control PLA 60. The Disable Signal to disable control PLA 60 is optional and was not implemented in the illustrated extensible CPU 12. In the illustrated embodiment, two separate signals were generated by control unit select logic 101 for each control unit 54 and 64. Two signals where used for each control unit because random control logic 62 had to be disabled before control PLA 60, and random control logic 72 had to be disabled before control ROM 70. Similarly, control PLA 60 had to be enabled before random control logic 62, and control ROM 70 had to be enabled before random control logic 72.

Control PLA 60 generates a Control Transfer Signal which is provided to both first state sequencer 58 and second state sequencer 68. The Control Transfer Signal is asserted after the special control transfer instruction is received. The Control Transfer Signal indicates to both first state sequencer 58 and second state sequencer 68 that control of execution unit 56 is being passed from control unit 54 to control unit 64.

If the special control transfer instruction has not yet been received, then the Control Transfer Signal is negated. If the Control Transfer Signal is negated, control unit 54 is enabled and control unit 64 is disabled. Also, if the Control Transfer Signal is negated, all of the outputs of control unit select logic 101 are negated. Negating the Disable Signal to random control logic 62 enables the Timed Control Signals to be provided to execution unit 56 from random control logic 62. Negating the optional Disable Signal to control PLA 60 allows Control PLA 60 to be strobed by first state sequencer 58. Negating the Enable Signal to random control logic 72 disables the Timed Control Signals so that they are not provided to execution unit 56 from random control logic 72. Negating the Enable Signal to control ROM 70 prevents Control ROM 70 from being strobed by second state sequencer 58.

If the special control transfer instruction has not yet been received, control ROM 70 is disabled. When control ROM 70 is disabled, it cannot change the logic state of its outputs. However, even though it is disabled, control ROM 70 continues to drive its output signals with either a predetermined initial pattern of logic states, or with the last pattern of logic states the output signals had before control ROM 70 was disabled. In one embodiment of the present invention, the last pattern of logic states the output signals had before control ROM 70 was disabled is always the same as the predetermined initial pattern of logic states.

The operation of first state sequencer 58 illustrated in FIGS. 2 and 4 will now be discussed in detail. The Control Transfer Signal from control PLA 60 is used to determine whether control unit 54 is controlling first state sequencer 58, or whether control unit 64 is controlling first state sequencer 58. The Control Transfer Signal is used to determine whether MUX 80 outputs an End Of Instruction Signal from control PLA 60, or whether MUX 80 outputs an End Of Instruction Signal from control ROM 70. Likewise, the same Control Transfer Signal is used to determine whether MUX 82 outputs a Lookahead Signal from control PLA 60, or whether MUX 80 outputs a Lookahead Signal from control ROM 70. Note that the Control Transfer Signal also determines whether the End of Instruction Signal input to state logic 84 is from control PLA 60 or from control ROM 70.

The Control Transfer Signal, in effect, determines whether control unit 54 or control unit 64 is controlling the flow of instructions through first state sequencer 58. The assertion of the output of MUX 82 causes an instruction from bus 32 to be loaded into opcode lookahead register 88. The assertion of the output of MUX 80 causes an instruction from opcode lookahead register 88 to be loaded into instruction register 86.

State logic 84 receives Next State Signals from control PLA 60. Decoder 89, in conjunction with control PLA 60, determines what the next state should be from these Next State Signals and from the present instruction stored in instruction register 86. If CPU core 50 is being used without the optional CPU control extension 52, then the Control Transfer Signal will never be asserted. However, if CPU core 50 is being used in conjunction with the optional CPU control extension 52, then control PLA 60 will assert the Control Transfer Signal and the output of decoder 89 will be effected by the Control Transfer Signal.

First state sequencer 58 also sends timing information (not shown) to control PLA 60 regarding when the inputs to control PLA 60 are valid and when the outputs from control PLA 60 are valid. When the outputs from control PLA 60 are valid, first state sequencer 58 enables the Control PLA Signals so that they are transmitted to random control logic 62. Random control logic 62 then qualifies the Control PLA Signals with timing information and with status information received back from execution unit 56 by way of the Status Signals. Random control logic 62 then outputs the Timed Control Signals, which are the complete set of signals required to fully control execution unit 56.

Because first state sequencer 58 may be used in a CPU core 50 which is functioning by itself without a CPU control extension 52, it may be desirable to locate most of the circuitry dealing with control transfer in the second state sequencer 68 and the control unit 64. It may be more efficient to include input and output paths for control signals dealing with control transfer in CPU core 50, but to locate most of the actual control transfer circuitry in CPU control extension 52. The advantage to this approach is that semiconductor area is not expended in CPU core 50 for functions that are not needed in a stand alone CPU core 50. Thus, the cost of the CPU core 50 by itself is kept at a minimum.

The operation of second state sequencer 68 illustrated in FIGS. 2 and 6 will now be discussed in detail. Second state sequencer 68 primarily functions as a state machine for CPU control extension 52. In this capacity, second state sequencer 68 receives instructions from bus 32. Second state sequencer 68 then decodes (using decoder 109) both the present instruction to be executed (from instruction register 106), as well as the present internal state of CPU control extension 52 (from state logic 104). Second state sequencer 68 then outputs signals from decoder 109 which are the inputs to control ROM 70.

The assertion of the Lookahead Signal from control ROM 70, in conjunction with a timing signal (not shown), causes an instruction from bus 32 to be loaded into instruction register 106. State logic 104 receives Next State Signals from control ROM 70. Decoder 109, in conjunction with control ROM 70, determines what the next state should be from these Next State Signals and from the present instruction stored in instruction register 106. Note that decoder 109 may continue to output signals to control ROM 70, even though control unit 64 has been disabled. Control ROM 70 is not effected by the inputs it receives from decoder 109 as long as Control ROM 70 is disabled.

State logic 104 includes a counter 107. Counter 107 can be written and possibly read from bus 32. Counter 107 can be used to create loops within an instruction executed by second state sequencer 68 and control unit 64. As an example, a customer may desire to add a new instruction which includes performing the same execution unit cycles "N" times, such as the shifting of a particular register value "N" times. By loading the value "N" into counter 107 and decrementing counter 107 after every execution unit cycle in which the particular register is shifted, state logic 104 is able to keep track of when the same state has been cycled through "N" number of times. State logic 104 then sends a signal to decoder 109 to indicate that the loop has finished. In this manner, a single instruction executed by CPU control extension 52 can in effect implement, in one instruction, steps which normally require multiple instructions.

Second state sequencer 68 also sends timing information (not shown) to control ROM 70 regarding when the inputs to control ROM 70 are valid and when the outputs from control ROM 70 are valid. When the outputs from control ROM 70 are valid, second state sequencer 68 enables the Control ROM Signals so that they are transmitted to random control logic 72. Random control logic 72 then qualifies the Control ROM Signals with timing information and with status information received back from execution unit 56 by way of the Status Signals. Random control logic 72 then outputs the Timed Control Signals, which are the complete set of signals required to fully control execution unit 56.

Now that the operation of first state sequencer 58 and second state sequencer 68 have been discussed, the transfer of control between control units 54 and 64 will be discussed in detail. In order to transfer control of execution unit 56 from control unit 54 to control unit 64, extensible CPU 12 must receive a special control transfer instruction.

Once the special control transfer instruction has been received by instruction register 86 from bus 32, then the transfer of control from control unit 54 to control unit 64 begins. Decoder 89 decodes the special control transfer instruction and outputs corresponding signals which are unique to the special control transfer instruction. Control PLA 60, which is still enabled, responds to the special control transfer instruction by asserting the Control Transfer Signal and by sending the Control PLA Signals to random control logic 62. Because the instruction being executed is the special control transfer instruction, random control logic 62 drives the Timed Control Signals with a first predetermined pattern of logic states, and then with a second predetermined pattern of logic states.

In one embodiment, this first predetermined pattern of logic states is the same as that driven by the Timed Control Signals during the first execution unit cycle of a NOP instruction. Driving the Timed Control Signals with the first predetermined pattern of logic states causes the program counter register 200, 206 in execution unit 56 to be incremented. Driving the Timed Control Signals with the second predetermined pattern of logic states has no effect on execution unit 56. During the second execution unit cycle, when the Timed Control Signals are being driven with the second predetermined pattern of logic states, control is actually transferred from control unit 54 to control unit 64.

Thus in one embodiment of the present invention, both control units 54 and 64 may simultaneously drive their respective Timed Control Signals with the second predetermined pattern of logic states while control is actually being transferred from control unit 54 to control unit 64. Once control is transferred, control unit 64 then executes one custom instruction. The last two execution unit cycles of each custom instruction are identical to the two execution unit cycles of the special transfer control instruction; both of which are identical to the two execution unit cycles of the NOP instruction.

The assertion of the Control Transfer Signal by control PLA 60 is used to initiate the transfer of control from control unit 54 to control unit 64. As a result of asserting the Control Transfer Signal, control unit 54 is disabled and control unit 64 is enabled. When the Control Transfer Signal is asserted, all of the outputs of control unit select logic 101 are asserted. The assertion of the signal from control unit select logic 101 to instruction register 106 causes instruction register 106 to load the second byte of the special control transfer instruction from bus 32.

Asserting the Disable Signal to random control logic 62 disables the Timed Control Signals so that they are not provided to execution unit 56 from random control logic 62. Asserting the optional Disable Signal to control PLA 60 prevents Control PLA 60 from being strobed by first state sequencer 58. Asserting the Enable Signal to random control logic 72 enables the Timed Control Signals to be provided to execution unit 56 from random control logic 72. Asserting the Enable Signal to control ROM 70 allows Control ROM 70 to be strobed by second state sequencer 58.

Note that the order in which the output signals from control unit select logic 101 are asserted is important. First, control ROM 70 must be enabled. Optionally, control PLA 60 may be disabled. Then random control logic 72 may be enabled. And finally, random control logic 62 may be disabled.

Second state sequencer 68 receives the second byte of the special transfer instruction from bus 32. In one embodiment of the present invention, the second byte of the special transfer instruction is the starting address in control ROM 70 of the custom instruction. Decoder 89 then transfers the starting address of the custom instruction to control ROM 70. Control ROM 70 uses this starting address to access a particular ROM location. The information stored in that particular ROM location is then output to random control logic 72 as the Control ROM Signals.

These Control ROM Signals indicate to random control logic 72 that it should drive the Timed Control Signals with the same second predetermined pattern of logic states which are being driven by random control logic 62. So for a brief period of time during the second execution unit cycle of the special control transfer instruction, both random control logic 62 and random control logic 72 are driving their respective Timed Control Signals with the same second predetermined pattern of logic states. The purpose of this brief overlap period is to ensure that the Timed Control Signals controlling execution unit 56 are never allowed to float or go to an unknown or unintended logic state. Thus the Timed Control Signals are always being driven by one or both of control units 54 and 64.

Once random control logic 72 is driving its Timed Control Signals with the second predetermined pattern of logic states, second state sequencer 68 asserts a Disable Signal to random control logic 62 which disables the output of the Timed Control Signals from random control logic 62. At this point, second state sequencer 68 and control unit 64 are completely controlling execution unit 56. First state sequencer 58 and control unit 54 now have no control of execution unit 56. However, in one embodiment of the present invention, first state sequencer 58 and control unit 54 continue to stay in the same state; that is, if random control logic 62 had not been disabled, it would continue to drive its Timed Control Signals with the second predetermined pattern of logic states.

The assertion of the Control Transfer Signal by control PLA 60 also effects first state sequencer 58. The assertion of the Control Transfer Signal is used to change the output of MUX 80 and the output of MUX 82. As a result of asserting the Control Transfer Signal, MUX 80 switches from outputting the End Of Instruction Signal from control PLA 60 to outputting the End Of Instruction Signal from control ROM 70. Similarly, as a result of asserting the Control Transfer Signal, MUX 82 switches from outputting the Lookahead Signal from control PLA 60 to outputting the Lookahead Signal from control ROM 70.

As a result of the assertion of the Control Transfer Signal, state logic 84 receives the End Of Instruction Signal from control ROM 70, instead of from control PLA 60. By using the End Of Instruction Signal from control ROM 70, state logic 84 is able to determine when the custom instruction is finishing and thus when control is to be transferred back from control unit 54 to control unit 64.

Second state sequencer 68 and control unit 64 receive the next instruction, the custom instruction, from bus 32. In one embodiment of the present invention, the custom instruction is actually a second byte of the special control transfer instruction which points to the location in control ROM 70 which is the starting address for the custom instruction.

Second state sequencer 68 and control unit 64 now control execution unit 56 entirely during the execution of this custom instruction. At the end of the custom instruction, random control logic 72 must once again drive its Timed Control Signals with the same second predetermined pattern of logic states. Second state sequencer 68 then re-enables the output of the Timed Control Signals from random control logic 62 by negating the Disable Signal. So again, for a brief period of time, both random control logic 62 and random control logic 72 drive their respective Timed Control Signals with the same second predetermined pattern of logic states.

At the end of the custom instruction, control ROM 70 asserts the End Of Instruction Signal. The assertion of the End Of Instruction Signal by control ROM 70 is used to initiate the transfer of control from control unit 64 back to control unit 54. As a result of asserting the End Of Instruction Signal, control unit 64 is disabled and control unit 54 is enabled.

When the End Of Instruction Signal is asserted, all of the outputs of control unit select logic 101 are negated. Negating the Disable Signal to random control logic 62 enables the Timed Control Signals to be provided to execution unit 56 from random control logic 62. Negating the optional Disable Signal to control PLA 60 allows Control PLA 60 to be strobed by first state sequencer 58. Negating the Enable Signal to random control logic 72 disables the Timed Control Signals so that they are not provided to execution unit 56 from random control logic 72. Negating the Enable Signal to control ROM 70 prevents Control ROM 70 from being strobed by second state sequencer 58.

Note that the order in which the output signals from control unit select logic 101 are negated is important. First, if control PLA 60 has been disabled, it must be re-enabled. Then random control logic 62 may be re-enabled. Next, random control logic 72 may be disabled. And finally, control ROM 70 may be disabled.

A second implementation (not illustrated) for passing control of execution unit 56 using a special control transfer instruction will now be discussed. In this second implementation, a Control Transfer Signal is not required. Instead, decoder 109 determines when the special control transfer instruction has been received and when control of execution unit 56 is to be transferred from control unit 54 to control unit 64. Decoder 109 then provides a signal to control unit select logic 101, in place of the Control Transfer Signal, which indicates that the control transfer should begin. This signal from decoder 109 has the same effect upon control unit select logic 101 as was described for the Control Transfer Signal.

Note that other embodiments of the present invention may use other approaches to transfer control of execution unit 56 between two or more control units. The use of a special control transfer instruction is just one way to transfer control. In addition, instead of automatically returning control of execution unit 56 to control unit 54 after execution of only one custom instruction, an approach could be used which allowed any number of custom instructions to be executed before control was passed back to control unit 54.

In the illustrated embodiment of the present invention, the special control transfer instruction should not be used if CPU core 50 is being used without CPU control extension 52. That is, if control unit 64 has not been implemented, control unit 54 must retain control of execution unit 56. Thus, when CPU core 50 is being used without CPU control extension 52, the special control transfer instruction is treated as an illegal opcode. Note that if the illegal opcode circuitry (not shown) in random logic 62 detects an illegal opcode, data processing system 10 is reset.

However, in order for CPU core 50 to be used with CPU control extension 52, one slight modification is required in control unit 54. Namely, control unit 54 must be modified so that the special control transfer instruction is no longer treated as an illegal opcode, but is actually executed as the special control transfer instruction. In one embodiment of the present invention, this modification merely consists of preventing one of the Control PLA Signals from being input to the portion of the random control logic 62 which detects that an illegal opcode has been received. In some implementations, this modification may be as simple as creating an open circuit in one conductor. As a result, the special control transfer instruction will not be interpreted as an illegal opcode when CPU core 50 is being used with CPU control extension 52.

Other embodiments of the present invention may use different approaches to transfer control of execution unit 56 between control unit 54 and control unit 64. In fact, just about any method that provides for a smooth transfer of control can be used. For example, a bit field in an instruction itself can be used to indicate which control unit, 54 or 56, is to control the execution unit during execution of that particular instruction.

Alternatively, a programmable control register can contain a bit field that determines which control unit is presently controlling the execution unit 56. Alternatively, a signal received from external to extensible CPU 12 can be used to indicate which control unit, 54 or 56, is to control the execution unit during execution of the subsequent instructions. This external signal could be generated in another section of data processing system 10, or this signal could be received from external to data processing system 10 by way of an integrated circuit pin.

Referring to FIG. 3, with a few differences, extensible CPU 12' illustrated in FIG. 3 may be the same as extensible CPU 12 illustrated in FIG. 2 and described herein above. Extensible CPU 12' includes several new blocks of circuitry, namely execution unit extension 153, random control logic extension 175, and control ROM extension 171.

In addition, one or more of the internal buses of execution unit 156 (i.e. EU internal buses) are routed to at least one physical edge of execution unit 156. Thus execution unit extension 153 can be added and directly coupled to one or more of the EU internal buses in order to increase the functionality of the combined execution units 153 and 156. Execution unit extension 153 may contain any desired circuitry, for example, one or more registers, one or more arithmetic logic units (ALUs), and any type of special function circuitry.

Random control logic extension 175 represents the extension or addition that may be made to random control logic 172 in order to control the circuitry included in execution unit extension 153. Random control logic 172 has the capability to generate the Timed Control Signals which fully control execution unit 156. However, random control logic 172 does not have the capability to generate the Timed Control Signals to fully control execution unit extension 153. Thus random control logic extension 175 may be needed to generate the Timed Control Signals to fully control execution unit extension 153.

Similarly, control ROM extension 171 represents the extension or addition that may be made to control ROM 170 in order to control the circuitry included in execution unit extension 153. Control ROM 170 has the capability to generate the Control ROM Signals which are required to fully control execution unit 156. However, control ROM 170 does not have the capability to generate the Control ROM Signals which are required to fully control execution unit extension 153. Thus control ROM extension 171 may be needed to generate the Control ROM Extension Signals which are required in order to fully control execution unit extension 153.

Note that first state sequencer 158 illustrated in FIG. 5 may be implemented in the same manner as first state sequencer 58 illustrated in FIG. 4. Also note that second state sequencer 168 illustrated in FIG. 7 may be implemented in the same manner as second state sequencer 68 illustrated in FIG. 6.

Referring to FIG. 8, other than the fact that the condition code register 228 is now located within execution unit 56, execution unit 56 functions internally in the same manner in which a prior art execution unit functions. However, the layout of execution unit 56 must allow for both control units 54 and 64 to provide the Timed Control Signals which control execution unit 56 and must allow for both control units 54 and 64 to receive the Status Signals. The details of how the Timed Control Signals control execution unit 56 are not illustrated. However, the Timed Control Signals are used to control execution unit 56 in the same manner as the prior art.

SUMMARY AND SOME ALTERNATE EMBODIMENTS

In summation, the present invention allows a new or prior art CPU to be made extensible so that circuitry can be easily added to extensible CPU 12 or 12' in order to meet differing customer needs, both in the present and in the future. As a result, the cost for individual customer flexibility has been significantly reduced.

The term "extensible" in regard to a CPU is used to mean that new instructions can be added to the CPU simply by adding certain designated circuitry, without any significant changes in the existing CPU circuitry. New instructions can be added merely by adding a second control unit 64 and a second state sequencer 68. Note that most of the second control unit 64 can be a duplicate of the original control unit 54, and that some of the second state sequencer 68 can be a duplicate of the original state sequencer 58. Some embodiments of the present invention may not require one or more of decoders 89, 99, 109, and 119.

In addition to adding new instructions which utilize the existing resources of execution unit 156, new resources can also be added as an extension to execution unit 156. The internal buses of execution unit 156 are routed to the physical edge of execution unit 156. Thus an execution unit extension 153 can be added and directly coupled to one or more of the internal buses of execution unit 156. Execution unit extension 153 increases the functionality of execution unit 156 by adding registers, another arithmetic logic unit (ALU), special function circuitry, or any other desired circuitry.

While the present invention has been illustrated and described with reference to specific embodiments, further modifications and improvements will occur to those skilled in the art. For example, in alternate embodiments of the present invention, alternate architectures for CPU core 50 and CPU control extension 52 may be used. The architectures illustrated in FIG. 2 and FIG. 3 are just two possible architectures that may be used. In addition, the present invention is not limited to only two control units 54 and 64. With a few modifications in the control transfer circuitry in first state sequencer 58 and second state sequencer 68, other embodiments of the present invention may use more than two control units.

Note that in alternate embodiments of the present invention, there may be a period of "non-driving" time during which neither control unit 54 nor control unit 64 is driving the Timed Control Signals. A "non-driving" time will not disrupt operation of extensible CPU 12 if the Timed Control Signals are not capable of permanently altering the internal state of execution unit 56 during the "non-driving" time (e.g. while execution unit internal buses are being precharged).

It is to be understood, therefore, that this invention is not limited to the particular forms illustrated and that it is intended in the appended claims to cover all modifications that do not depart from the spirit and scope of this invention.

We claim:

1. An extensible central processing unit, comprising:
   an execution unit, comprising:
      a first set of control inputs for receiving a first set of control signals, wherein in response to receiving the first set of control signals all of said execution unit is directly controlled by the first set of control signals;
      a second set of control inputs for receiving a second set of control signals, wherein in response to receiving only the second set of control signals all of said execution unit is directly controlled by the second set of control signals;
      a plurality of status registers which are all status registers which exist within said central processing unit;
      a first set of status outputs for providing a set of status signals which indicate a current state of the execution unit; and
      a second set of status outputs which also provide the same set of status signals which indicate the same current state of the execution unit; and
   a first control unit, coupled to said execution unit said first control unit providing the first set of control signals to said execution unit, and said first control unit receiving said set of status signals from said execution unit via the first set of status outputs.

2. A central processing unit, comprising:
   an execution unit, comprising:
      a first set of control inputs for receiving a first set of control signals, wherein if the first set of control signals is received by said execution unit, then all of said execution unit is directly controlled by the first set of control signals;
      a second set of control inputs for receiving a second set of control signals, wherein if the second set of control signals is received by said execution unit, then all of said execution unit is directly controlled by the second set of control signals;
      a plurality of status registers which are all status registers which exist within said central processing unit;
      a first set of status outputs for providing a set of status signals which indicate a current state of the execution unit; and
      a second set of status outputs which also provide the same set of status signals which indicate the same current state of the execution unit;
   a decode circuit for providing decode output signals;
   a first control unit, coupled to said execution unit and to said decode circuit, said first control unit receiving the decode output signals from said decode circuit, said first control unit providing the first set of control signals to said execution unit, and said first control unit receiving said set of status signals from said execution unit;
   a select circuit for providing a first enable/disable signal and a second enable/disable signal;
   first disable means, coupled to said select circuit for receiving the first enable/disable signal, and coupled between said execution unit and said first control unit, said first disable means for selectively enabling and disabling transfer of the first set of control signals to said first set of control inputs based upon the first enable/disable signal;

a second control unit, coupled to said execution unit, said second control unit providing the second set of control signals; and second disable means, coupled to said select circuit for receiving the second enable/disable signal, and coupled between said execution unit and said second control unit, said second disable means for selectively enabling and disabling transfer of the second set of control signals to said second set of control inputs based upon the second enable/disable signal;

wherein an extensible control instruction transfers control of said execution unit from said first control unit to said second control unit.

3. A central processing unit, comprising:

an execution unit;

a bus for transferring instructions, including a special control transfer instruction;

first control circuitry, coupled to said execution unit and coupled to said bus for receiving the transferred instructions including the special control transfer instruction, said first control circuitry decoding the transferred instructions and providing decoded instructions and control signals to said execution unit before the special control transfer instruction is transferred by said bus to said first control circuitry; and second control circuitry, coupled to said execution unit and coupled to said bus, said second control circuitry decoding the transferred instructions and providing decoded instructions and control signals to said execution unit in lieu of the first control circuitry and after execution by said execution unit of the special control transfer instruction.

4. A central processing unit as in claim 3, wherein said first control circuitry comprises:

a first control unit for generating a first set of execution unit control signals; and a first state sequencer circuit for generating first control unit input signals, said first state sequencer circuit being coupled to said first control unit.

5. A central processing unit as in claim 4, wherein said first control unit transfers control of said execution unit from said first control circuitry to said second control circuitry in response to receiving the special control transfer instruction.

6. A central processing unit as in claim 4, wherein said first control unit comprises:

a first programmable array for receiving the first control unit input signals from said first state sequencer circuit; and first random control logic, coupled to said first programmable array and to said execution unit, said first random control logic generating the first set of execution unit control signals.

7. A central processing unit as in claim 6, wherein said first programmable array is a programmable logic array.

8. A central processing unit as in claim 4, wherein said second control circuitry comprises:

a second control unit for generating a second set of execution unit control signals; and a second state sequencer circuit for generating second control unit input signals, said second state sequencer circuit being coupled to said second control unit.

9. A central processing unit as in claim 8, wherein said second control unit transfers control of said execution unit from said second control circuitry to said first control circuitry after execution of the special control transfer instruction has been completed.

10. A central processing unit as in claim 8, wherein said second control unit comprises:

a second programmable array for receiving the second control unit input signals from said second state sequencer circuit; and second random control logic, coupled to said second programmable array and to said execution unit, said second random control logic generating the second set of execution unit control signals.

11. A central processing unit as in claim 10, wherein said second programmable array is a read only memory.

12. A central processing unit as in claim 11, wherein the special control transfer instruction includes a starting address for the read only memory.

13. A central processing unit as in claim 3, wherein said execution unit comprises:

a plurality of internal execution unit buses.

14. A central processing unit as in claim 13, further comprising:

an execution unit extension circuit coupled to said plurality of internal execution unit buses.

15. A central processing unit, comprising:

a first control unit for generating a first set of execution unit control signals;

a second control unit for generating a second set of execution unit control signals;

an execution unit, coupled to said first control unit and to said second control unit, said execution unit being controlled by only one of the first and second sets of execution unit control signals when an instruction other than a special control transfer instruction is being executed, said execution unit is controlled by both the first and second sets of execution unit control signals during a portion of the special control transfer instruction; and state sequencer circuitry, coupled to said first control unit and to said second control unit, said state sequencer circuitry initiating a transfer of control of said execution unit from the first set of execution unit control signals to the second set of execution unit control signals as a result of receiving the special control transfer instruction.

16. A central processing unit as in claim 15, wherein the first set of execution unit control signals has a predetermined pattern of logic states during said portion of the special control transfer instruction, and wherein the second set of execution unit control signals also has the predetermined pattern of logic states during said portion of the special control transfer instruction.

17. A central processing unit as in claim 15, wherein said first control unit comprises:

a first programmable array for receiving first programmable array input signals from said state sequencer circuitry and for generating first programmable array output signals; and first random control logic, coupled to said first programmable array and to said execution unit, said first random control logic receiving the first programmable array output signals and generating the first set of execution unit control signals.

18. A central processing unit as in claim 17, wherein said first programmable array is a programmable logic array.

19. A central processing unit as in claim 17, wherein said second control unit comprises:
   a second programmable array for receiving second programmable array input signals from said state sequencer circuitry and for generating second programmable array output signals; and
   second random control logic, coupled to said second programmable array and to said execution unit, said second random control logic receiving the second programmable array output signals and generating the second set of execution unit control signals.

20. A central processing unit as in claim 19, wherein said second programmable array is a read only memory.

21. A central processing unit as in claim 19, wherein said first random control logic is substantially the same as said second random control logic.

22. A central processing unit as in claim 15, further comprising:
   a bus, coupled to said state sequencer circuitry, for transferring the special control transfer instruction and for subsequently transferring a first instruction.

23. A central processing unit as in claim 15, wherein said state sequencer circuitry comprises:
   a first state sequencer circuit, said first state sequencer circuit initiating a transfer of control of said execution unit from the first set of execution unit control signals to the second set of execution control signals as a result of receiving the special control transfer instruction; and
   a second state sequencer circuit, coupled to said first state sequencer circuit, said second state sequencer circuit returning control of said execution unit from the second set of execution control signals to the first set of execution unit control signals after execution of the special control transfer instruction has been completed.

24. A central processing unit as in claim 15, wherein a condition code register is physically located within said execution unit.

25. A central processing unit as in claim 15, wherein said execution unit comprises:
   a plurality of internal execution unit buses.

26. A central processing unit as in claim 25, wherein said execution unit further comprises:
   an arithmetic logic unit coupled to a first one of said plurality of internal execution unit buses; and
   a plurality of registers coupled to the first one of said plurality of internal execution unit buses.

27. A central processing unit as in claim 25, further comprising:
   an execution unit extension circuit coupled to said plurality of internal execution unit buses.

28. A central processing unit as in claim 15, wherein said state sequencer circuitry comprises:
   a counter for counting repetitions of an operation.

29. A method for operating a data processing system, the data processing system having a first control unit, having a second control unit, and having an execution unit which is controlled by a plurality of control signals, the method comprising the steps of:
   receiving a control transfer instruction;
   during execution of a first portion of the control transfer instruction, providing the plurality of control signals from the first control unit to said execution unit, and not from the second control unit to said execution unit; and
   during execution of a second portion of the control transfer instruction, providing said plurality of control signals from both the first and the second control units to said execution unit.

30. A method as in claim 29, further comprising the steps of:
   receiving a custom instruction; and
   during execution of a first portion of the custom instruction, providing the plurality of control signals from the second control unit to said execution unit, and not from the first control unit to said execution unit.

31. A method as in claim 30, further comprising the step of:
   during execution of a second portion of the custom instruction, providing said plurality of control signals from both the first and the second control units to said execution unit.

32. A method as in claim 29, further comprising the steps of:
   receiving a no operation (NOP) instruction; and
   during execution of the no operation instruction, providing a predetermined pattern of logic states on the plurality of control signals from the first control unit to said execution unit.

33. A method as in claim 32, further comprising the step of:
   during execution of the control transfer instruction, providing said predetermined pattern of logic states on the plurality of control signals from the first control unit to said execution unit.

34. A method as in claim 33, further comprising the step of:
   during execution of the control transfer instruction, providing said predetermined pattern of logic states on the plurality of control signals from the second control unit to said execution unit.

35. A method as in claim 34, further comprising the steps of:
   receiving a custom instruction; and
   during execution of the custom instruction, providing said predetermined pattern of logic states on the plurality of control signals from the first and second control units to said execution unit.

36. A method as in claim 29, wherein said step of receiving the control transfer instruction comprises the step of:
   receiving a starting address for a control read only memory.

37. A data processor, comprising:
   an execution unit comprising a plurality of execution unit buses;
   a bus for transferring instructions, including a special control transfer instruction;
   first control circuitry, coupled to said execution unit and to said bus, said first control circuitry controlling said execution unit before the special control transfer instruction is transferred by said bus;
   second control circuitry, coupled to said execution unit and to said bus, said second control circuitry controlling said execution unit after execution of the special control transfer instruction has been completed; and
   an execution unit extension circuit, coupled to at least one of said plurality of execution unit buses, and coupled to said second control circuitry by way of at least one control signal; and wherein during execution of a first portion of the control transfer instruction, said first control circuitry controls said execution unit, and during execution of a second portion of the control transfer instruction, both said first control circuitry and said second control circuitry control said execution unit.

38. A data processor as in claim 37, wherein during execution of the second portion of the control transfer instruction, both said first control circuitry and said second control circuitry provide a same predetermined pattern of logic states to said execution unit.

39. A data processor as in claim 38, wherein said bus for transferring instructions transfers a no operation (NOP) instruction, and wherein the same predetermined pattern of logic states is provided to the execution unit during a no operation (NOP) instruction.

40. A data processor as in claim 37, wherein said bus for transferring instructions transfers a custom instruction, and wherein execution of the custom instruction requires use of both said execution unit and said execution unit extension circuit.

41. A data processor as in claim 37, wherein said bus for transferring instructions transfers a custom instruction; and wherein during execution of the custom instruction, both said first control circuitry and said second control circuitry provide the same predetermined pattern of logic states to said execution unit.

42. A data processor, comprising:
   a first control unit which generates a first set of execution unit control signals;
   a second control unit which generates a second set of execution unit control signals;
   an execution unit, coupled to said first control unit and to said second control unit, said execution unit being controlled by both the first and second sets of execution unit control signals when a special control transfer instruction is being executed, said execution unit having a plurality of internal execution unit buses;
   an execution unit extension circuit, coupled to at least one of said plurality of internal execution unit buses, and coupled to said second control unit for receiving at least one execution unit extension control signal;
   a first state sequencer circuit, said first state sequencer circuit initiating a transfer of control of said execution unit from the first set of execution unit control signals to the second set of execution control signals as a result of receiving the special control transfer instruction; and
   a second state sequencer circuit, coupled to said first state sequencer circuit, said second state sequencer circuit returning control of said execution unit from the second set of execution control signals to the first set of execution unit control signals; and
wherein said execution unit is controlled by both the first and second sets of execution unit control signals during a portion of the special control transfer instruction, and wherein the first set of execution unit control signals have a predetermined pattern of logic states during said portion of the special control transfer instruction, and wherein the second set of execution unit control signals also have the predetermined pattern of logic states during said portion of the special control transfer instruction.

43. A data processor as in claim 42, wherein said first control unit comprises:
   a first programmable array for receiving first programmable array input signals from said first state sequencer circuitry and for generating first programmable array output signals; and
   first random control logic, coupled to said first programmable array and to said execution unit, said first random control logic receiving the first programmable array output signals and generating the first set of execution unit control signals.

44. A data processor as in claim 43, wherein said second control unit comprises:
   a second programmable array for receiving second programmable array input signals from said second state sequencer circuitry and for generating second programmable array output signals; and
   second random control logic, coupled to said second programmable array and to said execution unit, said second random control logic receiving the second programmable array output signals and generating the second set of execution unit control signals.

45. In a data processing system having an extensible central processing unit, said extensible central processing unit having an execution unit for executing instructions, said execution unit having a first set of control inputs and a second set of control inputs each for receiving control signals, a method of executing an extensible control instruction, the method comprising the steps of:
   said central processing unit receiving the extensible control instruction; and
   in response to said central processing unit receiving the extensible control instruction said execution unit executing a no operation (NOP) instruction;
wherein if said first set of control inputs is active, the method further comprising the steps of:
   said execution unit receiving control signals at said first set of control inputs;
   activating said second set of control inputs of said execution unit;
   said execution unit receiving control signals at said second set of control inputs; and
   deactivating said first set of control inputs of said execution unit.

46. A method as in claim 45, wherein said second set of control inputs is coupled to an external circuit.

47. In a data processing system having an execution unit adapted to perform a plurality of predetermined operations, and an instruction execution control circuit adapted to control the operation of the execution unit in response to each of a plurality of predetermined instructions, including a control transfer instruction, a method comprising the steps of:
   during operation of the data processing system in at least one mode:
      said control circuit receiving each of the plurality of predetermined instructions; and
      in response to said control circuit receiving one of said plurality of predetermined instructions other than the control transfer instruction:
         said control circuit controlling the execution unit in the execution of said one instruction ; but
      in response to said control circuit receiving said control transfer instruction:
         said control circuit initiating a transfer of control of said execution unit from the control circuit.

48. A method as recited in claim 47, further comprising the step of:
   in response to said control circuit receiving said control transfer instruction, said execution unit executing no operation (NOP); and
wherein said data processing system is a microcomputer.

49. In a data processing system having an execution unit, the method comprising the steps of:

provided in said execution unit, a first set of inputs and a second set of inputs;

providing in the data processing system a first set of instructions and a second set of instructions;

receiving, in the data processing system, a first instruction belonging to the first set of instructions, the first instruction not being included in the second set of instructions;

in response to receiving the first instruction, controlling the execution unit via control signals provided at the first set of inputs;

receiving, in the data processing system, an extensible control instruction different from the first instruction;

in response to receiving the extensible control instruction enabling the data processing system to receive the second set of instructions;

receiving, in the data processing system, a second instruction which is part of the second set of instructions but is not included in the first set of instructions;

in response to receiving the second instruction, controlling the execution unit via control signals provided at the second set of inputs;

receiving a second extensible control instruction different from the first instruction;

in response to receiving the second extensible control instruction enabling the data processing system to receive the first set of instructions;

receiving any instruction in the first set of instructions; and in response to receiving said any instruction, controlling the execution unit via control signals provided at the first set of inputs.

50. A method for processing a first and a second instruction in a central processing unit, the method comprising the steps of:

receiving a first instruction at a first set of inputs, the first instruction belonging to a first instruction set, the first instruction being included in a second instruction set;

processing the first instruction;

receiving a transfer instruction at the first set of inputs, where the transfer instruction is different from the first instruction;

transferring control of the execution unit from the first set of inputs to a second set of inputs in response to the transfer instruction;

receiving a second instruction at the second set of inputs, the second instruction belonging to a second instruction set but not belonging to the first instruction set;

processing the second instruction; and receiving a third instruction and a fourth instruction at the first set of inputs prior to receiving the transfer instruction, the third and fourth instructions belonging to the first instruction set, the third and fourth instructions sequentially performing a first algorithmic function.

51. A method as in claim 50, wherein the fourth instruction belongs to the second instruction set.

52. A method as in claim 50, wherein the second instruction set corresponds to a first data processing system and the first instruction set corresponds to a second data processing system.

53. A method as in claim 50, further comprising the step of transferring control of the central processing unit from the second set of inputs to the first set of inputs subsequent to processing the second instruction.

54. An integrated circuit comprising:

an execution unit comprising a plurality of execution unit buses;

a bus for transferring instructions, including a special control transfer instruction;

first control circuitry, coupled to said execution unit and to said bus, said first control circuitry controlling said execution unit before the special control transfer instruction is transferred by said bus;

second control circuitry, coupled to said execution unit and to said bus, said second control circuitry controlling said execution unit after execution of the special control transfer instruction has been completed; and an execution unit extension circuit, coupled to at least one of said plurality of execution unit buses, and coupled to said second control circuitry by way of at least one control signal; and wherein during execution of a first portion of the control transfer instruction said first control circuitry controls said execution unit, and during execution of a second portion of the control transfer instruction said second control circuitry controls said execution unit.

55. In a data processing system having an execution unit for executing instructions, a method of executing an extensible control instruction, the method comprising the steps of:

said execution unit receiving a first set of control signals at a first set of control inputs;

receiving the extensible control instruction;

in response to receiving the extensible control instruction said data processing system activating said second set of control inputs and deactivating said first set of control inputs;

receiving a second set of control signals at said second set of control inputs;

executing a first instruction corresponding to the second set of control inputs; and in response to executing the first instruction said data processing system activating said first set of control inputs and deactivating said second set of control inputs.

* * * * *